(12) United States Patent
Schiffmann et al.

(10) Patent No.: US 11,795,688 B2
(45) Date of Patent: Oct. 24, 2023

(54) STRUCTURAL BUILDING PANELS AND PANEL COMPONENTS, PANEL ASSEMBLIES, METHODS OF MAKING, AND METHODS OF USING

(71) Applicant: Composite Panel Systems, LLC, Eagle River, WI (US)

(72) Inventors: Glenn P. Schiffmann, St. Germain, WI (US); Gerhard P. Schiffmann, St. Germain, WI (US); Michael Justin Millis, Eagle River, WI (US)

(73) Assignee: Composite Panel Systems LLC, Eagle River, WI (US)

( * ) Notice: Subject to any disclaimer, the term of this patent is extended or adjusted under 35 U.S.C. 154(b) by 0 days.

(21) Appl. No.: 17/300,417

(22) Filed: Jun. 23, 2021

(65) Prior Publication Data

US 2022/0002997 A1    Jan. 6, 2022

Related U.S. Application Data

(60) Provisional application No. 63/102,782, filed on Jul. 1, 2020.

(51) Int. Cl.
| | |
|---|---|
| *E04C 1/00* | (2006.01) |
| *E04C 2/38* | (2006.01) |
| *E04C 2/296* | (2006.01) |
| *E04B 2/00* | (2006.01) |
| *B32B 7/12* | (2006.01) |

(Continued)

(52) U.S. Cl.
CPC ............... *E04C 2/38* (2013.01); *B32B 3/18* (2013.01); *B32B 5/18* (2013.01); *B32B 7/08* (2013.01); *B32B 7/12* (2013.01); *B32B 27/065* (2013.01); *B32B 27/36* (2013.01); *E04B 2/70* (2013.01); *E04C 2/296* (2013.01); *E04C 2/46* (2013.01); *B32B 2260/046* (2013.01); *B32B 2266/0278* (2013.01); *B32B 2307/732* (2013.01); *B32B 2607/00* (2013.01); *E04B 2103/04* (2013.01)

(58) Field of Classification Search
CPC ................ E04C 2/38; B32B 3/18; B32B 5/18
See application file for complete search history.

(56) References Cited

U.S. PATENT DOCUMENTS

| | | |
|---|---|---|
| 4,074,489 A | 2/1978 | Eckel |
| 4,078,348 A | 3/1978 | Rothman |

(Continued)

*Primary Examiner* — Basil S Katcheves
(74) *Attorney, Agent, or Firm* — Thomas D. Wilhelm

(57) ABSTRACT

Light weight fiber-reinforced polymeric structural building panels and methods; sized, configured for fabrication of non-portable wall structures permanently fixed to natural base. The panel main body, and studs, can be fabricated separately, then assembled to each other to complete panel fabrication. Methods for making the main body are hand lay-up, or pultrusion. Studs are typically pultruded, and subsequently prepared having consistent thickness, flat surface, across the width of the stud end wall which is to be mounted to the main body. Foam blocks are between inner and outer layers of the panel. Foam blocks can be prepared in block clusters before assembly to the main body. In the main body, a fibrous layer is between each pair of next adjacent foam blocks. Intercostals extend "y" and "z" dimensions transverse to the length of the main body. Studs can be mounted to the main body using adhesive, mechanical fasteners, or both.

41 Claims, 10 Drawing Sheets

(51) Int. Cl.
    *B32B 7/08*     (2019.01)
    *B32B 5/18*     (2006.01)
    *B32B 3/18*     (2006.01)
    *B32B 27/36*    (2006.01)
    *B32B 27/06*    (2006.01)
    *E04B 2/70*     (2006.01)

(56) References Cited

U.S. PATENT DOCUMENTS

| | | |
|---|---|---|
| 4,083,159 A | 4/1978 | Hatch et al. |
| 4,178,406 A | 12/1979 | Russell |
| 4,205,408 A | 6/1980 | Glass et al. |
| 4,233,053 A | 9/1980 | Brogan |
| 4,229,919 A | 10/1980 | Hughes |
| 4,275,538 A | 6/1981 | Bounds |
| 4,310,992 A | 1/1982 | Thabet |
| 4,313,688 A | 2/1982 | Daniels |
| 4,339,390 A | 7/1982 | Yoshioka et al. |
| 4,341,051 A | 7/1982 | Sim et al. |
| 4,343,669 A | 8/1982 | Prior |
| 4,463,531 A | 8/1984 | Iorio Peretto |
| 4,464,873 A | 8/1984 | Geiger |
| 4,471,591 A | 9/1984 | Jamison |
| 4,557,091 A | 12/1985 | Auer |
| 4,730,428 A | 3/1988 | Head et al. |
| 4,777,774 A | 10/1988 | Smalley, III |
| 4,984,406 A | 1/1991 | Friesen |
| 5,037,498 A | 8/1991 | Umeda |
| 5,052,164 A | 10/1991 | Sandow |
| 5,059,377 A | 10/1991 | Ashton et al. |
| 5,069,737 A | 12/1991 | Guiton |
| 5,403,063 A | 4/1995 | Sjostedt et al. |
| 5,462,623 A | 10/1995 | Day |
| 5,509,242 A | 4/1996 | Rechsteiner et al. |
| 5,526,625 A | 6/1996 | Emblin et al. |
| 5,547,737 A | 8/1996 | Evans et al. |
| 5,572,841 A | 11/1996 | Buster |
| 5,589,243 A | 12/1996 | Day |
| 5,664,518 A | 9/1997 | Lewit et al. |
| 5,706,620 A | 1/1998 | De Zen |
| 5,707,576 A | 1/1998 | Asher |
| 5,743,056 A | 4/1998 | Balla-Goddard et al. |
| 5,761,862 A | 6/1998 | Hendershot et al. |
| 5,813,182 A | 9/1998 | Commins |
| 5,834,082 A | 11/1998 | Day |
| 5,857,297 A | 1/1999 | Sawyer |
| 5,875,596 A | 3/1999 | Muller |
| 5,890,334 A | 4/1999 | Hughes, Jr. |
| 5,899,037 A | 5/1999 | Josey |
| 5,953,883 A * | 9/1999 | Ojala ................... E04B 1/26 52/270 |
| 5,979,684 A | 11/1999 | Ohnishi et al. |
| 5,996,296 A | 12/1999 | Bisbee |
| 6,041,561 A | 3/2000 | LeBlang |
| 6,041,562 A | 3/2000 | Martella et al. |
| 6,082,066 A | 7/2000 | Mill |
| 6,092,340 A | 7/2000 | Simmons |
| 6,125,597 A | 10/2000 | Hoffman et al. |
| 6,131,365 A | 10/2000 | Crockett |
| 6,164,035 A | 12/2000 | Roberts |
| 6,205,729 B1 | 3/2001 | Porter |
| 6,212,849 B1 | 4/2001 | Pellock |
| 6,244,005 B1 | 6/2001 | Wallin |
| 6,256,960 B1 | 7/2001 | Babcock et al. |
| 6,279,288 B1 | 8/2001 | Keil |
| 6,308,491 B1 | 10/2001 | Porter |
| 6,314,704 B1 | 11/2001 | Bryant |
| 6,381,793 B2 | 5/2002 | Doyle et al. |
| 6,408,594 B1 | 6/2002 | Porter |
| 6,418,686 B1 | 7/2002 | Record |
| 6,427,403 B1 | 8/2002 | Tambakis |
| 6,467,118 B2 | 10/2002 | Dumlao et al. |
| 6,481,172 B1 * | 11/2002 | Porter ................... B32B 5/18 52/794.1 |
| 6,484,460 B2 | 11/2002 | VanHaitsma |
| 6,599,621 B2 * | 7/2003 | Porter ................... E04C 2/296 428/322.2 |
| 6,670,291 B1 | 12/2003 | Tompkins et al. |
| 6,799,403 B2 | 10/2004 | Winter |
| 6,854,499 B2 | 2/2005 | Miller |
| 6,871,600 B2 | 3/2005 | Norton et al. |
| 6,942,915 B1 | 9/2005 | Kondo et al. |
| 7,052,563 B2 | 5/2006 | Dong et al. |
| 7,127,865 B2 | 10/2006 | Douglas |
| 7,334,372 B2 | 2/2008 | Evans et al. |
| 7,343,715 B2 | 3/2008 | Ito et al. |
| 7,393,577 B2 | 7/2008 | Day et al. |
| 8,607,531 B2 | 12/2013 | Schiffmann et al. |
| 8,844,230 B2 * | 9/2014 | Harkins ................ E04B 9/0414 52/404.1 |
| 8,904,737 B2 | 12/2014 | Schiffmann et al. |
| 9,493,938 B2 | 11/2016 | Schiffmann et al. |
| 9,745,737 B2 * | 8/2017 | Raidt ................... B32B 27/40 |
| 2001/0031350 A1 | 10/2001 | Day et al. |
| 2002/0014302 A1 | 2/2002 | Fanucci et al. |
| 2002/0069600 A1 | 6/2002 | Bryant |
| 2002/0122954 A1 | 9/2002 | Dagher |
| 2003/0056460 A1 | 3/2003 | Rivington |
| 2003/0136079 A1 | 7/2003 | Ruggie et al. |
| 2004/0134162 A1 | 7/2004 | Douglas |
| 2004/0157519 A1 | 8/2004 | Goodell et al. |
| 2005/0138891 A1 | 6/2005 | Wool et al. |
| 2005/0262791 A1 | 12/2005 | Pringle et al. |
| 2006/0123725 A1 | 6/2006 | Godwin |
| 2006/0236653 A1 | 10/2006 | Showers |
| 2006/0254167 A1 | 11/2006 | Antonic |
| 2007/0074469 A1 | 4/2007 | Plagemann et al. |
| 2007/0094992 A1 | 5/2007 | Antonic |
| 2007/0107370 A1 | 5/2007 | Douglas |
| 2007/0125042 A1 | 6/2007 | Hughes et al. |
| 2007/0209305 A1 | 9/2007 | Douglas |
| 2007/0251183 A1 | 11/2007 | Thiagarajan et al. |
| 2007/0266659 A1 | 11/2007 | LaPierre |
| 2008/0104909 A1 | 5/2008 | Wallin |
| 2008/0127600 A1 | 6/2008 | Schiffmann et al. |
| 2008/0307747 A1 | 12/2008 | Douglas |
| 2011/0197530 A1 * | 8/2011 | Bahnmiller ........... B32B 27/304 52/762 |
| 2013/0318911 A1 * | 12/2013 | Sealock ................ E04C 2/243 428/71 |
| 2014/0102024 A1 * | 4/2014 | Schiffmann ........... E02D 27/013 428/114 |
| 2015/0089891 A1 * | 4/2015 | Schiffmann ............ E04C 2/46 52/309.1 |
| 2015/0240441 A1 * | 8/2015 | Schiffmann ........... E02D 31/00 52/293.1 |
| 2016/0160503 A1 * | 6/2016 | Beals ................... E04C 2/34 52/794.1 |

\* cited by examiner

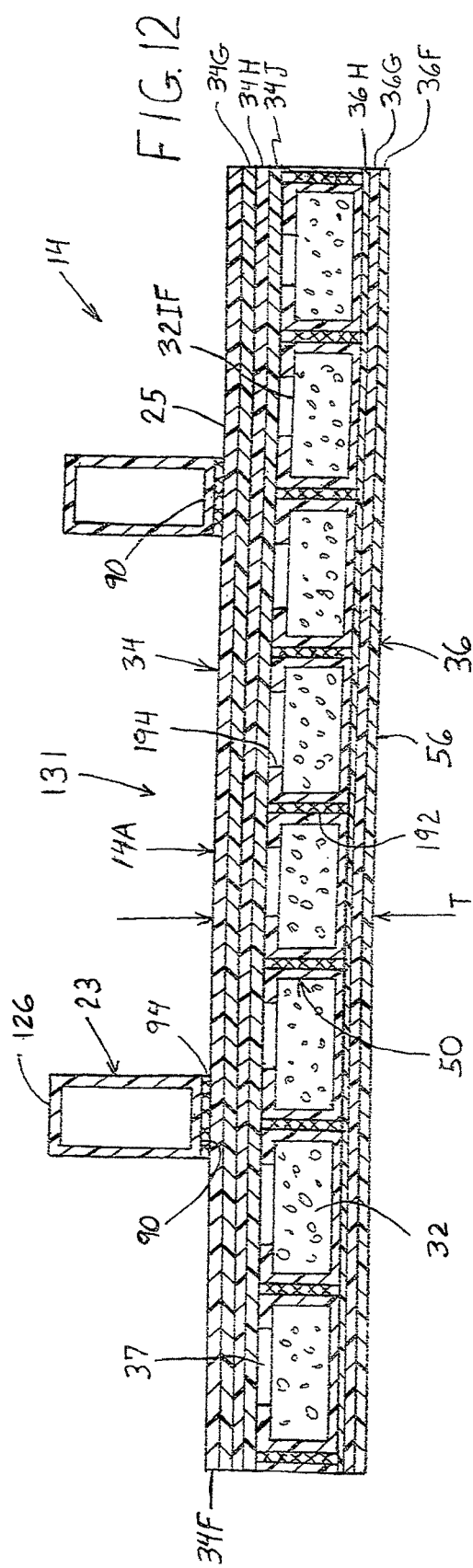
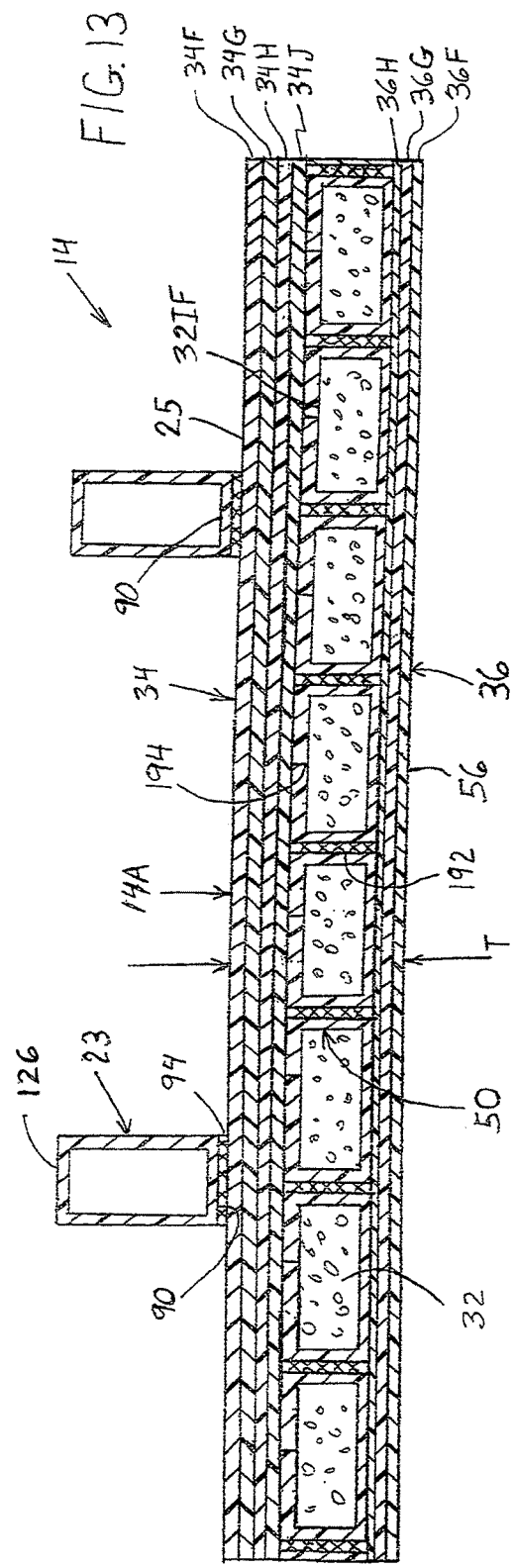

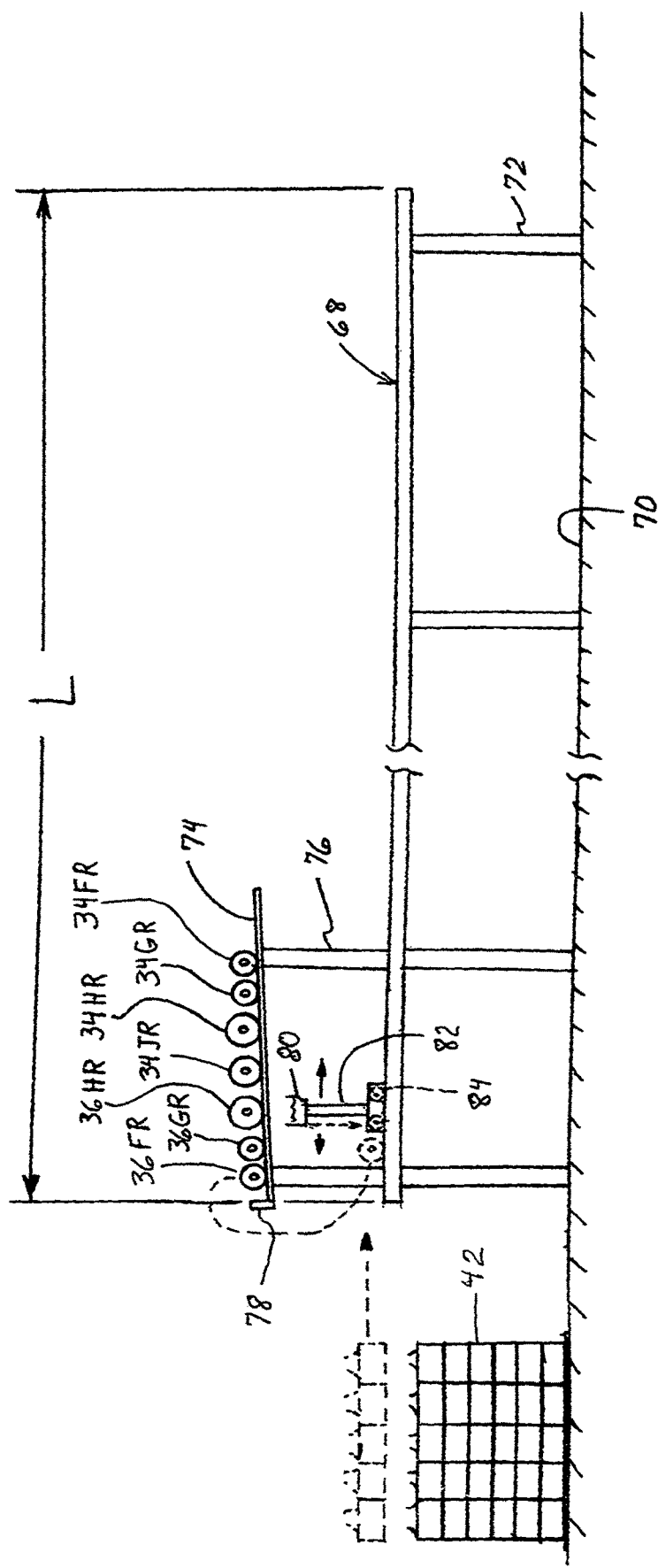

STRUCTURAL BUILDING PANELS AND PANEL COMPONENTS, PANEL ASSEMBLIES, METHODS OF MAKING, AND METHODS OF USING

This application claims priority under 35 U.S.C. 120, as a non-provisional patent application, to Provisional Patent Application 63/102,782, granted a filing date of Jul. 1, 2020, the entirety of which is incorporated herein by reference.

BACKGROUND OF THE INVENTION

This invention relates to building systems which largely replace upright uses of concrete, whether ready-mix concrete or pre-fabricated concrete blocks, or other pre-fabricated concrete products, in relatively low-rise construction projects. In general, the invention relates to enclosed buildings as well as other structures, replacing concrete in below-grade frost walls and foundation walls, and in some above-grade walls. Such concrete structures are replaced, in the invention, with structures based on fiber-reinforced polymeric materials (FRP). The bottoms of such FRP walls can be integrated with, or can interface with, a concrete or other footer, and/or a concrete or other floor.

Certain improvements in building construction, including building panels, walls, buildings, appurtenances, methods of making building panels, and methods of constructing walls, wall systems, and buildings are taught in the following United Stated patents:

U.S. Pat. No. 7,905,067 issued Mar. 15, 2011,
U.S. Pat. No. 7,926,233 issued Apr. 19, 2011,
U.S. Pat. No. 7,926,241 issued Apr. 19, 2011,
U.S. Pat. No. 7,930,861 issued Apr. 26, 2011,
U.S. Pat. No. 8,012,301 issued Sep. 6, 2011,
U.S. Pat. No. 8,082,711 issued Dec. 27, 2011,
U.S. Pat. No. 8,266,867 issued Sep. 18, 2012,
U.S. Pat. No. 8,272,190 issued Sep. 25, 2012,
U.S. Pat. No. 8,322,097 issued Dec. 4, 2012,
U.S. Pat. No. 8,322,098 issued Dec. 4, 2012,
U.S. Pat. No. 8,393,123 issued Mar. 12, 2013,
U.S. Pat. No. 8,516,777 issued Aug. 27, 2013,
U.S. Pat. No. 8,534,028 issued Sep. 17, 2013,
U.S. Pat. No. 8,607,531 issued Dec. 17, 2013,
U.S. Pat. No. 8,793,966 issued Aug. 5, 2014,
U.S. Pat. No. 8,904,737 issued Dec. 9, 2014, and
U.S. Pat. No. 9,493,938 issued Nov. 15, 2016, all of the above patents being incorporated herein by reference, in their entireties.

There remains a need, in the construction industry, for additional improvements in relatively lighter weight structural building panels, and building systems incorporating such building panels. For example, generally continuous FRP building panels of any desired length up to a maximum length per panel, selectable in length, in height, and in thickness, are desirable whereby such structural FRP building panels may be used in applications where concrete is conventionally used in residential, commercial, and light industrial construction. Such structural FRP building panels should be strong enough to bear the primary compressive loads of the overlying building components, as well as strong enough to bear lateral loads, for example lateral earth loads, or wind loads, which are Imposed on underlying walls, e.g. foundation walls, or above-ground walls, in a building enclosure or other building structure.

There is also a need for improved methods for manufacturing light weight structural FRP building panels.

There is further a continuing need for walls which are generally impermeable to water, including at joints in the wall.

These and other needs are alleviated, or at least attenuated, by the novel construction products, methods, and building systems of the invention.

SUMMARY OF THE DISCLOSURE

This invention includes light weight fiber-reinforced polymeric structural building panels and methods, sized and configured primarily for construction of non-portable wall structures permanently fixed to the ground. Foam blocks, optionally fiber wrapped, are disposed between inner and outer layers of the panel. The foam blocks can be prepared in block clusters before being assembled into the panel. In some embodiments, a fiber flow is disposed between each pair of next adjacent ones of the foam blocks. The panel can have studs, mounted to a main body of the building panel, mounted either with adhesive, or with mechanical fasteners, or both. Where a such stud is pultruded, and adhesively mounted to the main body, a such stud which is adhesively mounted to the main body can have a consistent thickness across the width of the stud end wall and/or can have a fabricated straight surface across the width of the stud.

Precursors for the main body of the panel can be fabricated using a hand/manual lay-up process, where layers of fiberglass, and at least one layer of fiberglass-wrapped foam blocks, are sequentially laid out, typically dry, on a processing table, each layer on top of the preceding layer, with resin being applied after a given layer, or set of layers, has been laid out. After all layers are laid out, and application of resin to the respective layers has been completed, the assemblage is compressed, top to bottom and, while so compressed, the resin is cured to convert the liquid resin into a solid plastic state, typically in an oven. After the resin is cured, the panel precursor is trimmed for length and width. In some embodiments, where the main body precursor is long enough, multiple main bodies are cut from the precursor, whereby each cured precursor embodies multiple building panel main bodies.

In the alternative, precursors of the building panel main body can be provided by pultruding the respective combination of materials, including the foam blocks, through a pultrusion die where the materials travel through the pultrusion die in a direction which provides a continuous-length precursor extending along what will become the lengths of the main bodies of building panels which are derived from the precursor. Lengths of the foam blocks extend transverse to the direction of advance of the materials being pultruded, typically extending along the width of the pultruded product. The pultrusion product/precursor, coming out of the pultrusion die, is trimmed across the width of the pultrusion product/precursor, thereby cutting the precursor for length, representing the lengths of the main bodies of finished building panels which are to be made from the pultrusion product/precursor. The width of the pultrusion product represents what will become the height of the building panel. Any fiberglass layers which wrap the foam blocks extend transverse to the direction of pulling of the pultrusion components through the pultrusion process. Such resin-impregnated, and cured, fiberglass layers which can wrap the foam blocks form intercostals in the panels, extending top-to-bottom in an upstanding such panel.

Typically, the main body of the panel is fabricated separately from reinforcing studs. The studs are typically pultruded, optionally with 1.5×3.5 inch cross-section, well known in conventional wood lumber, so the studs can be dimensionally equal replacements for conventional 2×4 wood studs. One narrow side of each pultruded stud, namely a stud end wall, can optionally be sanded flat, thus defining a straight surface across the width of the stud. The sanding reduces the thickness of that one stud end wall by about 0.03 inch to about 0.07 inch, so that the outer surface of the reduced-thickness stud end wall is substantially flat, thus extending as a straight, planar surface, across the width of the stud. Such flattened surface of the stud end wall is roughened by such sanding, relative to the surface roughness of that stud end wall as received from the pultruder. The additional roughness and flatness are believed to assist in adhesive bonding of the respective stud surface to the main body of the building panel. The adhesive bonding between the stud end wall and the main body is optionally secured in place, while the liquid adhesive is hardening/curing, by driving screws or other mechanical fasteners, at each end of the stud, through the respective stud end wall at the main body surface, and into the main body of the building panel, at the layer of the panel which will face into the building. One or more additional screws/fasteners can be driven through the reduced-thickness stud end wall at mid-length of the stud, or elsewhere between stud ends, each such fastener having traversed an access port in an opposing sidewall of the stud.

In a first family of embodiments, the invention comprehends a fiber-reinforced polymeric structural building panel having a length, a top, and a bottom, and comprising, as a first component of the building panel, a main body, fabricated in a first fabrication process and comprising an outer fiber-reinforced polymeric layer, the outer layer comprising a first set of fibers in a first reaction-cured resin composition, the outer layer defining a first outermost surface of the main body; an inner fiber-reinforced polymeric layer, the inner layer comprising a second set of fibers in a second reaction-cured resin composition, the inner layer defining a second outermost surface of the main body, opposite the first outermost surface of the main body; and as a second component of the building panel, fabricated by use of a second fabrication process, different from the first fabrication process, a plurality of load-bearing studs, spaced along the length of the main body and extending, from the inner layer of the main body, away from the second outermost surface to end walls of the studs, including away from the main body, the studs extending along the height of the building panel, between the top and the bottom of the building panel, the studs having a plurality of stud walls, defining outer surfaces of the studs, the walls of a given stud comprising a third set of fibers in a third reaction-cured resin composition, a first mounting one of the stud walls, comprising a stud end wall, having a first thickness at a midpoint along a width of the stud end wall substantially equal to a second thickness of the stud end wall at a respective corner of the first stud end wall.

In some embodiments, the first stud end wall has been subjected to a post-fabrication roughening procedure thereby enhancing receptivity of the stud end wall to chemical adhesion to a building panel main body.

In some embodiments, the studs are secured to the main body only by adhesive.

In some embodiments, the studs are secured to the main body only by mechanical fasteners.

In some embodiments, the studs are secured to the main body by a combination of adhesive and mechanical fasteners.

In some embodiments, the mechanical fasteners comprise first and second fasteners accessing the first stud end wall through opposing open ends of the stud.

In some embodiments, one or more additional mechanical fasteners access the first stud end wall through respective one or more access ports in a second stud end wall opposing the first stud end wall, and between opposing open ends of the stud.

In some embodiments, the building panel has a vertical, top-to-bottom crush resistance capacity of at least 4000 pounds per linear foot length of the building panel, using a safety factor of 3.

In some embodiments, the building panel, under a top-to-bottom load distributed between the outer layer and the end walls of the studs remote from the main body, according to ASTM E72, deflects toward the outer layer.

In some embodiments, the building panel has a vertical crush resistance capacity, to catastrophic panel failure, when tested according to ASTM E72, of at least 20,000 pounds per linear foot length of the building panel.

In some embodiments, at least 50 percent by weight, of at least one of the first, second, and third sets of fibers in the main body, collectively, extends in a direction within 15 degrees of the top-to-bottom height of the building panel.

In some embodiments, at least 50 percent by weight of each of the first, second, and third sets of fibers in the main body extends in a direction which is substantially aligned with, thus extends parallel to, the top-to-bottom height of the building panel.

In some embodiments, the invention comprehends an upright outer wall in a building comprising one or more building panels of the invention.

In a second family of embodiments, the invention comprehends a fiber-reinforced polymeric structural building panel having a length, a top, and a bottom, and comprising, as a first component of the building panel, a main body, fabricated in a first fabrication process and comprising an outer fiber-reinforced polymeric layer, the outer layer comprising a first set of fibers in a first reaction-cured resin composition, the outer layer defining a first outermost surface of the main body; an inner fiber-reinforced polymeric layer, the inner layer comprising a second set of fibers in a second reaction-cured resin composition, the inner layer defining a second outermost surface of the main body, opposite the first outermost surface of the main body; and as a second component of the building panel, fabricated by use of a second fabrication process, different from the first fabrication process, a plurality of load-bearing studs, spaced along the length of the main body and extending, from the inner layer, away from the second outermost surface to end walls of the studs, including away from the main body, the studs extending along the height of the building panel between the top and the bottom of the building panel, at least one of the studs being mounted to a surface of the main body by at least one of (i) adhesive, (ii) one or more mechanical fasteners, or (iii) a combination of adhesive and one or more mechanical fasteners.

In some embodiments, a respective stud is mounted to the respective surface of the main body by at least first and second mechanical fasteners accessing a first such stud end wall, facing the surface of the main body, through opposing open ends of the stud.

In some embodiments, a third mechanical fastener accesses the first stud end wall through an access port in a second stud end wall opposing the first stud end wall.

In a third family of embodiments, the invention comprehends a fiber-reinforced polymeric structural building panel having a length, a top, and a bottom, and comprising, as a first component of the building panel, an outer fiber-reinforced polymeric layer, the outer layer comprising a first set of fibers in a first reaction-cured resin composition, the outer layer defining a first outermost surface of the building panel; as a second component of the building panel, an inner fiber-reinforced polymeric layer, the inner layer comprising a second set of fibers in a second reaction-cured resin composition, the inner layer defining a second outermost surface of the building panel, opposite the first outermost surface of the building panel; and as a third component of the building panel, a plurality of foam block clusters disposed between the inner layer of the building panel and the outer layer of the building panel, each foam block cluster comprising a plurality of foam blocks, the building panel, when installed in an upright orientation, having a length and a height, and a thickness defined between the inner layer and the outer layer, a given foam block, in a respective foam block cluster, having a length extending along the height of the building panel, a width extending along the length of the building panel, and a thickness extending along the thickness of the building panel, the foam blocks, in a given block cluster, having been secured to each other, by at least one of (i) adhesive, or (ii) a mechanical keeper, or (iii) a combination of adhesive and a mechanical keeper, with at least one fibrous layer between respective opposing faces of ones of next adjacent ones of the foam blocks, prior to the foam block cluster being interposed between the inner layer and the outer layer in the building panel.

In some embodiments, the building panel further comprises a plurality of studs affixed to the second outermost surface of the inner fiber-reinforced polymeric layer.

In some embodiments, the at least one fibrous layer extends the lengths of the respective next adjacent ones of the foam blocks and from a location at least proximate the inner layer to a location at least proximate the outer layer.

In some embodiments, each foam block, in a given foam block cluster, is wrapped with a fibrous wrapping layer extending about at least first, second, and third surfaces of the foam block and extending along a length of the respective foam block.

In some embodiments, the foam blocks are assembled to each other in block clusters without concurrent addition of resin, wherein a fibrous resin flow layer is interposed between respective opposing next adjacent pairs of the foam blocks, and wherein the foam blocks are held to each other, in the block cluster, by a mechanical keeper.

In some embodiments, at least one of the foam blocks and the fibrous layer are wetted with resin before the respective sides of the foam blocks are brought into facing relationship with each other in the process of fabricating the block clusters, wherein no mechanical keeper need be employed.

In some embodiments, each foam block is wrapped with a fibrous layer, and at least one such fibrous layer is wetted with resin at a locus on the fibrous layer which faces the surface of a given foam block which will face a next adjacent foam block in the block cluster being fabricated, and wherein no mechanical keeper need be employed and no resin flow layer need be employed.

In a fourth family of embodiments, the invention comprehends a block cluster adapted and configured for use in a fiber reinforced polymeric building panel, the block cluster comprising a collection of foam blocks, comprising at least first, second, and third foam blocks, each foam block having an elongate length, a width, and a thickness, each foam block also having a top side, a bottom side, a left side, and a right side, each side extending along the entire length of the respective foam block, each foam block also having top, bottom, left, and right surfaces corresponding, respectively, to the top side, the bottom side, the left side, and the right side, a respective foam block having a density of about 1 pound per cubic foot to about 8 pounds per cubic foot; the foam blocks being arranged in sequential side by side relationship with each other such that next adjacent sides of respective ones of the foam blocks are facing each other, whereby the first and second foam blocks comprise a first pair of next adjacent foam blocks in side by side relationship with each other, the second and third foam blocks comprise a second pair of next adjacent foam blocks in side by side relationship with each other, and optional subsequent foam blocks comprise subsequent pairs of next adjacent foam blocks in side by side relationship with each other, starting at the third foam block on a side of the third foam block opposite the second foam block, whereby surfaces of the respective sides of next adjacent ones of the foam blocks face each other, the foam blocks being so arranged, in side by side relationship to each other that each foam block defines at least a portion of the top of the block cluster and at least a portion of the bottom of the block cluster, a fibrous layer being disposed between the outer surfaces of the respective sides of each pair of next adjacent foam blocks.

In some embodiments, the foam blocks are assembled to each other in block clusters without concurrent addition of resin, wherein a fibrous resin flow layer is interposed between respective opposing pairs of the foam blocks, and wherein the foam blocks are held to each other, in the block cluster, by a mechanical keeper.

In some embodiments, at least one of the foam blocks and the fibrous layer are wetted with resin before the respective sides of the foam blocks are brought into engaging relationship with each other in the process of fabricating the block clusters, wherein no mechanical keeper is employed.

In some embodiments, at least one such fibrous layer is wetted with resin adjacent the surface of a given first foam block which will face a next adjacent second foam block in the block cluster being fabricated, wherein no mechanical keeper need be employed and no resin flow layer need be employed.

In some embodiments, the fibrous layer comprises a wrapping layer, wrapped about, and facing, both the left side and the right side of the respective foam block, such that each foam block is a wrapped foam block, wrapped in an individual wrapping layer, separate and distinct from any wrapping layer wrapping any other foam block.

In some embodiments, the wrapping layers are adhered to the respective facing surfaces of the respective wrapped foam blocks.

In some embodiments, a fibrous flow medium is disposed at the sides of respective next adjacent ones of the facing side surfaces, and between the respective wrapping layers on the next adjacent ones of the foam blocks.

In some embodiments, a mechanical keeper secures the wrapped foam blocks, in the block cluster, to each other.

In some embodiments, such mechanical keeper is selected from the group consisting of
  a thread extending, in tension, in generally a straight line through each foam block in the block cluster from the first foam block, through each sequential foam block, to an opposing end foam block on an opposing end of the block cluster,
  one or more securing layers extending over the top, about the sides, and across the bottom, of the block cluster, in surface to surface relationship with any wrapping layers, collectively defining an outer surface of the block cluster at the top, the bottom, and the opposing sides of the block cluster, and securing the foam blocks to each other in such side by side relationship; and one or more e.g. plastic or metal straps extending over the top, about the sides, and across the bottom, of the block cluster, in surface to surface relationship with any wrapping layers, the one or more straps securing the foam blocks to each other in such side by side relationship.

In a fifth family of embodiments, the invention comprehends a method of fabricating a main body of a fiber-reinforced polymeric structural building panel, comprising applying a precursor for a first outermost layer of the main body on a processing table, comprising laying, on the processing table, components for a first outermost layer of the building panel, comprising, laying out a plurality of fiber layers on the processing table, each having a length and a width, each succeeding fiber layer overlying substantially the full length and the full width of the next adjacent underlying fiber layer, and applying liquid resin to the full length and the full width of each such fiber layer after the respective fiber layer is laid on the processing table, thus to create a liquid resin-impregnated precursor for the first outermost layer of the main body, the precursor for the first outermost layer having a length and a width; applying a foam block layer to the precursor for the first outermost layer, the applying of the foam block layer comprising laying, on the precursor for the first outermost layer, a plurality of foam blocks, each such foam block having an elongate length, a width, and a thickness, a top side, a bottom side, a left side, and a right side, the top side and the bottom side extending along the entire length of the respective foam block, each foam block also having top, bottom, left, and right surfaces corresponding respectively to the top side, the bottom side, the left side, and the right side of the respective foam block. The lengths of the foam blocks extend across the width of the processing table and along the length of the processing table. The respective foam blocks are arranged in side-by-side relationship to each other, with the side surfaces of each respective pair of next adjacent ones of such foam blocks facing each other. A layer of fibrous material is disposed between, and optionally adhered to, the facing sides of respective pairs of next adjacent ones of such foam blocks, the foam block precursor layer overlying substantially the full length and the full width of the precursor for the first outermost layer. The method comprises applying liquid resin to the full length and the full width of the foam block precursor layer, thus to create a resin-coated foam block precursor layer on top of the resin-impregnated precursor for the first outermost layer of the main body. The method further comprises applying a precursor for a second and opposing outermost layer of the main body on the foam block precursor layer, comprising laying, on the resin-impregnated foam block precursor layer of the main body, components for a second outermost precursor layer of the main body of the building panel, which second outermost layer precursor opposes the first outermost layer, comprising laying out a plurality of fibrous layers on the foam block precursor layer, each such fibrous layer having a length and a width, a first such fibrous layer overlying substantially the full length and the full width of the resin-coated foam block precursor layer, each such succeeding fibrous layer overlying the next adjacent underlying layer, and applying liquid resin to the full length and the full width of each such fibrous layer after the respective fibrous layer is laid on the underlying layers, thus to create the second outermost layer precursor, the precursor for the second outermost layer having a length and a width approximately corresponding to the respective lengths and widths of the first outermost precursor layer and the foam block precursor layer; the combination of the first and second outermost precursor layers and the wrapped foam block precursor layer collectively defining a precursor of the main body of a fiber reinforced, liquid-resin-impregnated structural building panel having an overall length and an overall width. The method still further comprises consolidating and curing the building panel main body precursor by applying pressure about the overall length and the overall width of the top and bottom surfaces of the fiber reinforced structural building panel main body precursor, thereby urging the top and bottom surfaces of the precursor toward each other, and while applying such pressure, heating the building panel main body precursor and thereby curing the resin, thereby to make a dimensionally stable main body precursor wherein the liquid resin has been converted to a solid plastic state.

In some embodiments, the method further comprises trimming the main body precursor to a desired width, thereby trimming off irregular edge portions of the main body precursor, as well as cutting across the width of the main body precursor to define a main body having a desired length.

In some embodiments, the method further comprises adhesively mounting a plurality of studs to the main body, thereby providing a building panel having studs as part of the building panel structure.

In some embodiments, the method comprises cutting across the width of the main body precursor to thereby define at least first and second building panel main bodies having desired lengths.

In a sixth family of embodiments, the invention comprehends a method of fabricating a pultruded fiber-reinforced polymeric structural building panel, comprising feeding into a resin impregnator, having a length and a width, a plurality of foam blocks, each such foam block having an elongate length, a width, and a thickness, a top side, a bottom side, a left side, and a right side, the top side and the bottom side optionally extending along the entire length of the respective foam block, each foam block also having top, bottom, left, and right surfaces corresponding respectively to the top side, the bottom side, the left side, and the right side of the respective foam block. The lengths of the foam blocks extend across substantially the full width of the resin impregnator, the widths of such foam blocks extending along the direction of advance of the materials being pultruded, the respective foam blocks being arranged in side-by-side relationship to each other, with the side surfaces of each respective pair of next adjacent ones of the foam blocks facing each other. A layer of fibrous material is disposed between, and optionally adhered to, the facing sides of respective pairs of next adjacent ones of the foam blocks. The method further comprises pulling a first set of one or more fibrous layers into the resin impregnator under, and in contact with, the plurality of foam blocks, the widths of the first set of fibrous layers extending across substantially the full width of the resin impregnator; pulling a second set of one or more fibrous layers into the resin impregnator above, and in contact with, the plurality of foam blocks, the widths of the second set of fibrous layers extending across substantially the full width of the resin impregnator; feeding liquid resin into the resin impregnator while pulling the combination of the first set of fibrous layers, the second set of fibrous layers, and the foam blocks through the resin impregnator and thereby impregnating, with the liquid resin, the first set of fibrous layers, the second set of fibrous layers, and the foam blocks. The method further comprises, after passing through the resin impregnator, exposing the resin-impregnated combination, having a top and a bottom, to curing heat which can cure the liquid resin to a solid plastic state, optionally while compressing the top and the bottom of the combination toward each other, thereby developing the fiber-reinforced polymeric building panel structure, having a width, and a continuous length, and wherein the resulting fiber layers, between the foam blocks, extend substantially the full width of the so-cured fiber-reinforced polymeric building panel structure.

In some embodiments, the method further comprises pulling first and second fibrous surface veil layers onto the top and the bottom of the resin impregnated combination before the resin impregnated combination is exposed to the curing heat.

In some embodiments, the method further comprises periodically cutting across the width of the building panel structure which has been exposed to the curing heat source, and has been cured, thereby to define, individual and plural building panel structures having desired lengths.

In some embodiments, the method further comprises adhesively mounting a plurality of studs to ones of such building panel structures.

In some embodiments, dry wrapping layers are disposed on the foam blocks when the foam blocks are fed into the resin impregnator, with the layer of fibrous material between next adjacent ones of the wrapped foam blocks.

In some embodiments, resin/adhesive is applied to the layer of fibrous material between the foam blocks before the respective foam blocks are brought into facing relationship with each other.

In some embodiments, resin/adhesive is applied to the wrapped foam blocks before the respective foam blocks are brought into facing relationship with each other.

In a seventh family of embodiments, the invention comprehends a pultrusion process for pultruding a fiber-reinforced polymeric structural building panel structure precursor, which building panel structure precursor exits the pultrusion process along a given pultrusion direction, the pultrusion process comprising feeding into a resin impregnator, having a length and a width, a plurality of foam blocks, each such foam block having an elongate length, a width, and a thickness, a top side, a bottom side, a left side, and a right side, the top side and the bottom side extending along the entire length of the respective foam block, a fibrous layer being associated with at least one of the left side and the right side of each foam block and extending in both a "y" direction and a "z" direction between the top and the bottom of the respective foam block, both the "y" and "z" directions extending transverse to the pultrusion direction; pulling a first set of a plurality of fibrous layers into the resin impregnator under, and in contact with, the plurality of foam blocks, the widths of the first set of fibrous layers extending across substantially the full width of the resin impregnator; pulling a second set of a plurality of fibrous layers into the resin impregnator above, and in contact with, the plurality of foam blocks, the widths of the second set of fibrous layers extending across substantially the full width of the resin impregnator; feeding liquid resin into the resin impregnator while pulling the combination of the first set of fibrous layers, the second set of fibrous layers, and the foam blocks through the resin impregnator and thereby impregnating, with the liquid resin, the first set of fibrous layers, the second set of fibrous layers, the foam blocks, and the fibrous layers associated with the foam blocks; from the resin impregnator, pulling the resin impregnated combination, having a top and a bottom, past a curing heat source wherein the liquid resin is effectively heated, and thereby cured to a solid plastic state, thereby developing the fiber-reinforced polymeric building panel structure precursor, having a width, and a continuous length.

In an eighth family of embodiments, the invention comprehends a method of fabricating a fiber-reinforced polymeric structural building panel having, in an upright use orientation, a length, a first top, a first bottom, and a firs height, the method comprising fabricating, in a first fabrication process, as a first component of the building panel, a panel main body, the main body, in the upright use orientation, having a second length, a thickness, and a second height, and comprising an outer fiber-reinforced polymeric layer, the outer layer comprising a first set of fibers in a first reaction-cured resin composition, the outer layer defining a first outermost surface of the main body, an inner fiber-reinforced polymeric layer, the inner layer comprising a second set of fibers in a second reaction-cured resin composition, the inner layer defining a second outermost surface of the main body, opposing the first outermost surface, and one or more filler materials and/or structural members between the inner layer and the outer layer; further comprising fabricating, in a second fabrication process, different from the first fabrication process, as second components of the building panel, a set of load-bearing studs, to be spaced along the length of the main body and to extend, from the inner layer of the main body, away from the second outermost surface of the main body to end walls of the studs, including away from the main body, a given stud having an elongate length, opposing end walls extending the full elongate length of the stud, and opposing legs connecting the opposing end walls to each other and extending the full length of the stud. The method comprises, for mounting the studs to the main body, selecting stud end walls for mounting to the main body; applying adhesive to the selected stud end walls on the respective studs; placing the studs on the main body at selected spaced locations along the length of the main body, with the selected end walls in contact with the second outermost surface of the main body at the inner layer, through the adhesive, the lengths of the studs extending along the height of the main body; and enabling the adhesive to cure, thus securely mounting the studs on the main body as placed, at the spaced locations, thereby completing fabrication of the fiber-reinforced polymeric structural building panel.

In some embodiments, the method comprises placing the studs on the main body parallel to each other.

In some embodiments, the method further comprises, after placing the studs on the main body, driving mechanical fasteners, such as screws or nails, through the selected stud end walls and into the main body, optionally proximate opposing ends of the respective studs, to thereby temporarily fix the studs at the placed locations while the adhesive cures.

In some embodiments, the method further comprises, after driving the mechanical fasteners through the selected stud end walls, and before the adhesive between the selected stud end walls and the main body has cured, moving the so-fabricated building panel from the fabrication location to a curing location, whereby the mechanical fasteners hold the studs in the selected spaced locations on the main body while the adhesive is curing.

In some embodiments, the method comprises mounting the studs to the main body by use of mechanical fasteners and without use of resin or adhesive.

BRIEF DESCRIPTION OF THE DRAWINGS

FIG. 12 is a cross-section of a portion of a length of a first embodiment of building panels of the invention where each foam block is wrapped on 3 sides with a fiberglass wrapping layer, with the fourth side optionally not wrapped, or with end portions of the wrapping layers overlying portions of the fourth side and/or not adhered to the foam blocks, and wherein the studs are adhesively mounted to the main body of the panel.

FIG. 13 is a cross-section of a portion of a length of a second embodiment of building panels of the invention as in FIG. 12 but wherein the foam blocks are wrapped with fiberglass on, and optionally covering, all four sides, with the end portions of the fiberglass wrapping layers adhered to the foam blocks, optionally with one of the end portions of the wrapping layers overlapping the other of the end portions.

FIG. 15 is a side elevation representation of an exemplary hand/manual lay-up process for fabricating main body components of building panels of the invention.

Figure 1:
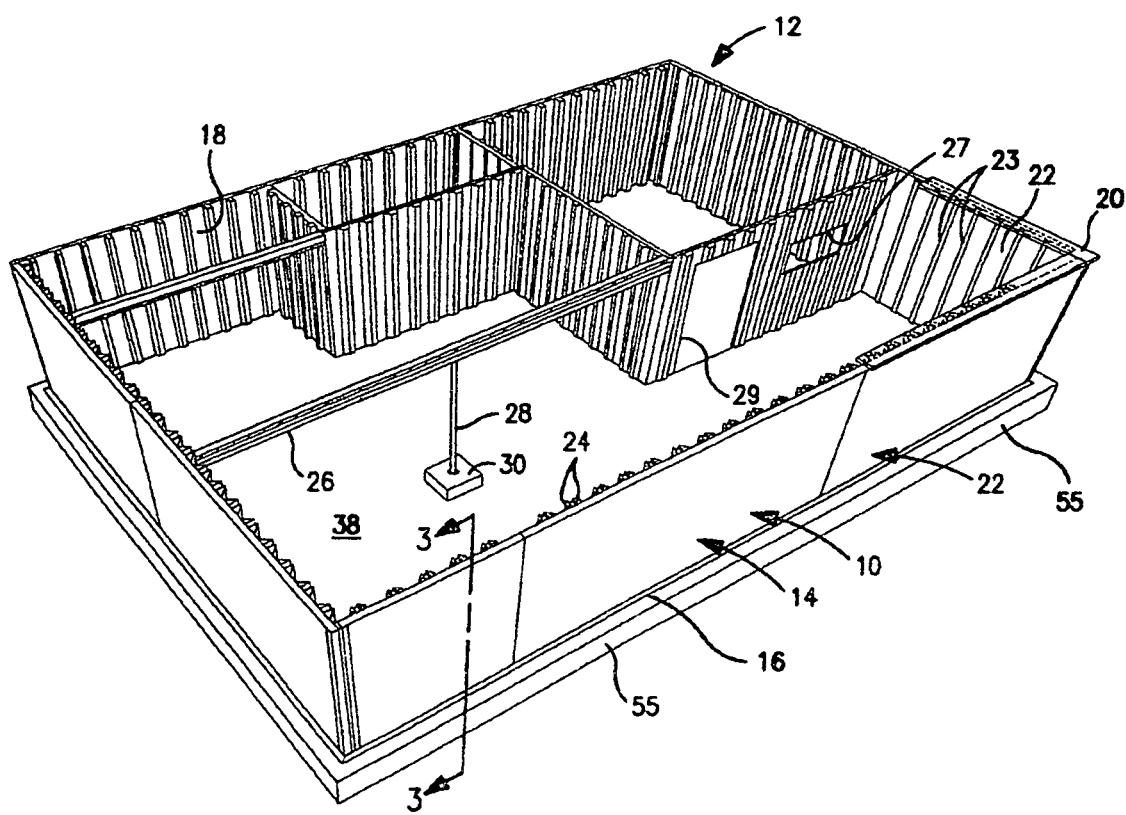
FIG. 1 shows a representative pictorial view, with parts removed, of a building foundation wall fabricated using elements, and building system components and structures, of the invention.
Figure 2:
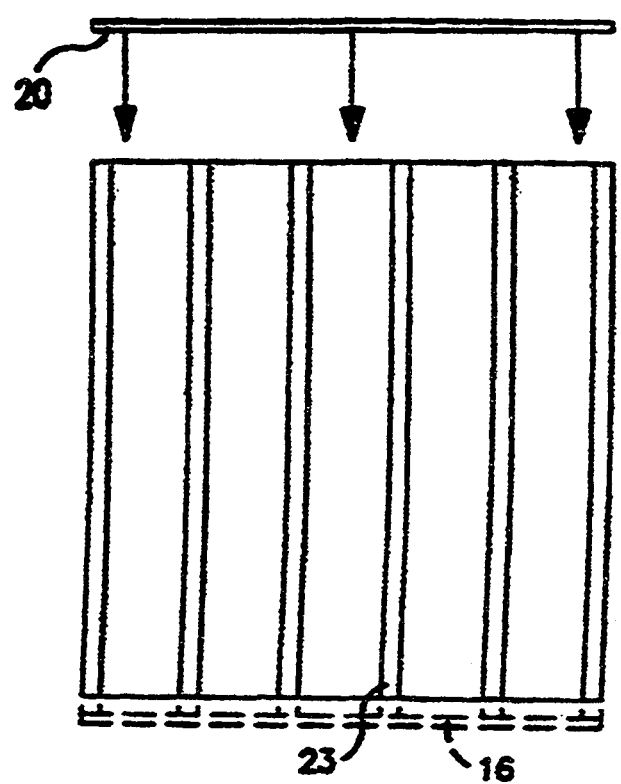
FIG. 2 is a fragmented interior view of a section of one of the upstanding wall structures shown in FIG. 1.

The invention is not limited in its application to the details of construction, or to the arrangement of the components set forth in the following description or illustrated in the drawings. The invention is capable of other embodiments or of being practiced or carried out in various other ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Referring to FIG. 1, a plurality of interior and exterior foundation walls 10 collectively define the foundation 12 of a building. Each foundation wall 10 is defined by one or more building panels 14 of the invention. As illustrated in FIG. 1, a given building panel 14 includes an upstanding wall section 18, and can further include a bottom plate 16 and/or a top plate 20. Each upstanding wall section 18 includes a plurality of panels 14, each having a main body 14A (FIGS. 4, 12, and 13), and uprightly-oriented reinforcing studs 23 affixed to the main body, the studs being regularly spaced along the length of the main body, and extending inwardly of the inner surface of the main body e.g. inwardly into the space enclosed by a building (FIG. 1). In the embodiment illustrated in FIG. 1, anchoring hurricane brackets 24 are mounted to the studs at the top and bottom of the wall section, thus to assist in anchoring the bottom plate and the top plate to the wall.

As illustrated in FIG. 1, a conventional e.g. steel I-beam 26 can be mounted to the wall sections, as needed, to support spans of overlying floors or other loads. Such I-beam can be supported at one or more locations along the span of the I-beam, as needed, by support posts 28 and rigid footer pads 30, which may be embedded in a concrete slab floor 38.

Figure 3:
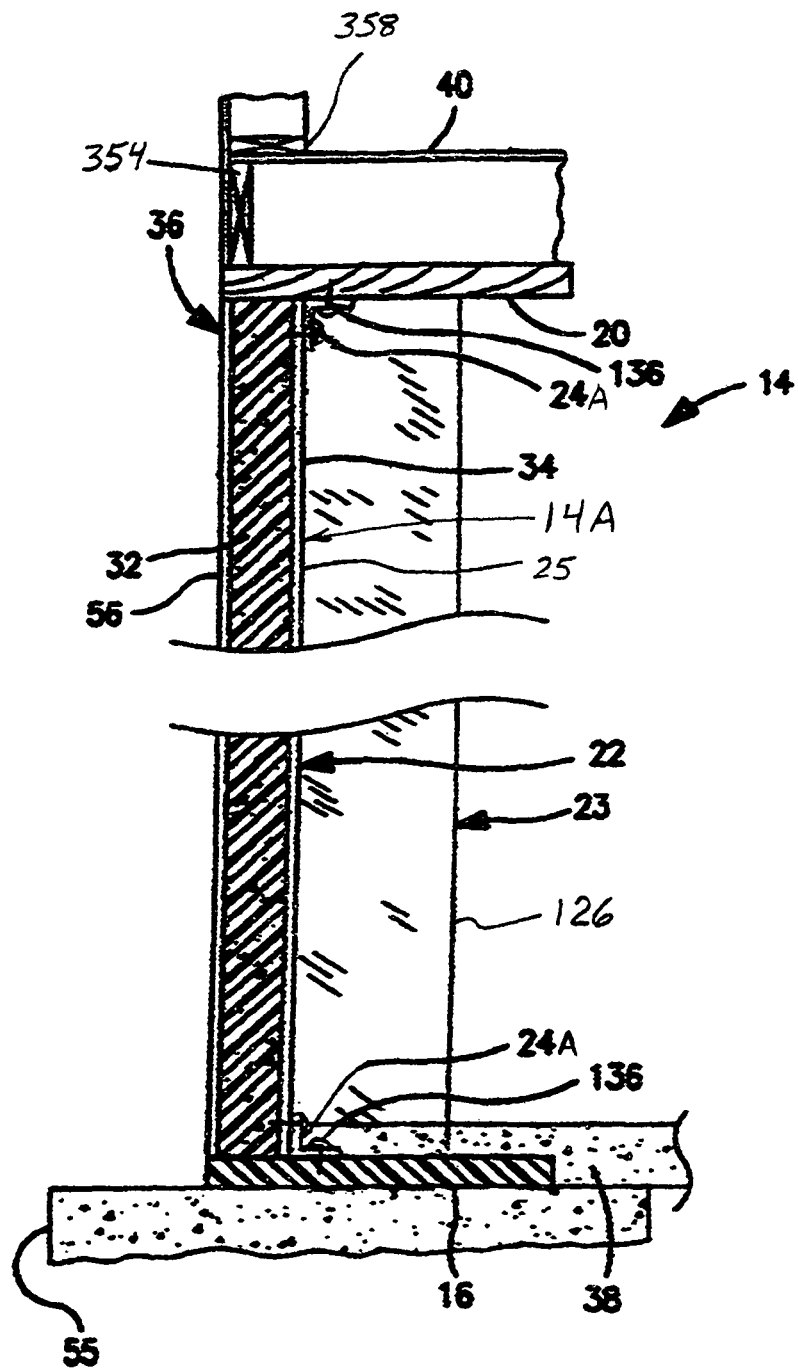
FIG. 3 is an elevation-view cross-section of the upstanding wall structure taken at 3-3 of FIG. 1.
Figure 14:
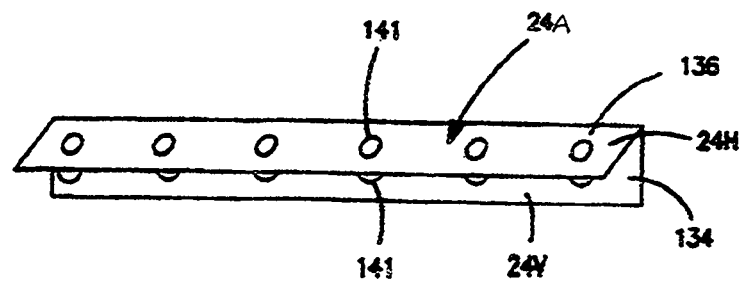
FIG. 14 is a pictorial view of an angle bracket which can be used at the top of the building panel to secure a top plate to the building panel, and which can also be used at the bottom of the building panel to secure a bottom plate to the building panel.

Referring to FIGS. 3 and 12, the main body 14A of the building panel is generally defined between inner surface 25 of main body 14A and outer surface 56 of the main body, without considering that portion of the thickness of the wall which is defined by studs 23. The main body of the panel generally includes a thermally insulating foam core comprising a plurality of elongate foam blocks 32, an inner fiberglass layer 34 and an outer fiberglass layer 36. Fiberglass layers 34, 36 are fiberglass-reinforced polymer (FRP), also known as polymer-impregnated fiberglass. Each layer 34, 36, is typically comprised of multiple resin-impregnated fiberglass sub-layer components. Outer layer 36 represents a first outermost layer of the building panel and, correspondingly, first outer layer of the main body. Inner layer 34 represents a second opposing outermost layer of the building panel and, correspondingly, a second outer layer of the main body, opposing the first outer layer. The insulating foam core can be, for example and without limitation, a polyisocyanurate foam, or other insulating foam. An exemplary foam is a polyisocyanurate foam according to ASTM C 1289 Type II, 2 pounds per cubic foot (pcf). The foam core can be foamed in place between pre-fabricated inner and outer layers, or between inner and outer layers which layers are in the process of being formed, or can be made from pre-fabricated blocks of thermally insulating foam material. In the illustrated embodiments, pre-fabricated foam blocks are assembled with the remaining elements of the main body as described in further detail hereinafter. Bottom plate 16 and top plate 20 can be secured to the main body with the support of elongate angle-shaped brackets 24A as illustrated in FIGS. 3 and 14, as an alternative to the hurricane brackets 24 discussed with respect to FIG. 1.

Elongate angle-shaped bracket 24A resembles, in cross-section, a length of conventional angle iron. For sake of material consistency, an FRP composition, similar to that of e.g. inner and outer layers 34, 36 can be used as the material in angle-shaped bracket 24A, or as a layer of the material in angle-shaped bracket 24A. Bracket 24A has sufficient rigidity to effectively assist panel 14 in supporting the overlying structure in a generally angularly-constant relationship as the overlying structure is supported by the underlying building panel. As used with an upright building panel 14, angle bracket 24A has a vertical leg 24V and a horizontal leg 24H, the two legs 24V, 24H meeting, and being connected to each other, at the apex of the angle formed by the two legs. Angle bracket 24A has an elongate length which generally extends for a distance up to as great as the portion of the length of the panel which extends between adjacent studs 23. Thus, where the distance between adjacent studs is 14.5 inches, length of the angle bracket is typically about 8-13 inches. A plurality of holes 141, extending through each of the legs 24V, 24H, are spaced along the length of the bracket.

At the top of the panel, bracket 24A interfaces with, and supports, top plate 20, and may be mounted to the top plate with bolts or screws. One or more screws 136 (FIG. 3) extend through apertures 141 in horizontal leg 24H of the bracket, through any cap or bracket which may overlie the main body of the building panel, and into or through top plate 20, thus securing the top plate to bracket 24A. Bracket 24A can be secured to the corresponding panel 14 by additional screws 136 which extend through apertures 141 in vertical leg 24V of the bracket and through inner layer 34 of the building panel. Bracket 24A thereby serves to transfer a portion of the overlying building load from the top plate 20, through bracket 24A and screws 136, to the main body of the building panel at inner layer 34, thereby making bracket 24A an integral load-bearing element of the underlying wall. Adhesive can be used instead of, or in combination with, screws 136 to secure either or both of vertical leg 24V and horizontal leg 24H to the respective building panel, or top plate, or bottom plate.

In the embodiment illustrated in FIG. 3, top plate 20 spreads the load of the overlying floor 40 and other structure over the full width of main body 14A and the depths of studs 23, such depths extending away from the main body.

Still referring to FIG. 3, rim joist 354 overlies and bears on top plate 20, and extends along the length of top plate 20, and thus along the length of the respective wall. Rim joist 354 is affixed to top plate 20 by a plurality of mechanical fasteners such as nails or screws (not shown) which mechanical fasteners are spaced along the lengths of the top plate and the rim joist. A plurality of floor joists or floor trusses are typically spaced along the length of top plate 20, and thus along the length of rim joist 354, and extend transversely from rim joist 354 into and/or across the building, thus to provide support for the overlying floor 40.

Conventional wall plate 358 overlies floor 40 and is secured to the floor joists and the rim joist by a plurality of mechanical fasteners such as screws or nails. Wall plate 358 and its overlying structure, shown only in nominal part, represent the overlying walls which, along with the other building structure, enclose the respective floor/story of the building and bear the associated loads which ultimately bear on the foundation wall through floor 40, the respective joists or trusses, rim joist 354, and top plate 20.

The length of angle bracket 24A extends generally along most or all of the width of the respective cavity 131 (FIG. 12) between adjacent studs 23, and is mounted at the upper corner of the wall where the upper portion of main body 14A meets top plate 20. Bracket 24A is secured to the upper portion of the main body of panel 14 by screws 136 which extend through apertures 141 into, optionally through, inner layer 34. Additional screws 136 extend through additional apertures 141 in angle bracket 24A upwardly into top plate 20, optionally into overlying joists or trusses, thus securing top plate 20 and such trusses to bracket 24A, whereby plate 20 and the trusses are secured to panel 14 by operation of screws 136 and bracket 24A. Brackets 24, 24A can be used in every cavity as desired, in alternating cavities, or at otherwise-selected cavity spacings, depending on the stresses expected to be imposed on the overlying joists/trusses. Brackets 24, 24A can be similarly placed and secured by screws at the lower corner of the main body of the panel, joining the bottom of the panel at inner layer 34 to the underlying footer or bottom plate, as illustrated in FIG. 3.

Still referring to FIG. 3, bottom plate 16 is optional, and where used and as illustrated, can be a rather thin, e.g. about 0.18 inch to about 0.50 inch thick, stiff and rigid resinous e.g. pultruded plate which has sufficient stiffness and rigidity to spread the vertical load, for which the panel is designed, over substantially the full downwardly-facing surface area of the bottom plate, thus transferring the vertical load to the underlying footer.

Referring again to FIG. 3, a concrete slab floor 38 is shown overlying, generally, that portion of bottom plate 16 which extends inwardly into the building from the inner surface 25 of main body 14A of panel 14, the concrete slab floor, further, extending inwardly from studs 23. Slab floor 38 abuts the inner surfaces of main body 14A of panel 14, overlies brackets 24A, and also abuts studs 23, thus stabilizing the bottom end of the panel against inwardly-directed forces exerted on the outer surface of the panel, which inwardly-directed forces reach the lower end of the panel. Angle bracket 24A is positioned in the lower corner of panel 14 as defined by inner surface 25 of the panel and the top of bottom plate 16. Screws or other mechanical fasteners 136 extend through upwardly-extending flange 24V of bracket 24A, securing the bracket to main body 14A of the panel at inner layer 34. Additional screws or other fasteners 136 can extend through horizontally-extending flange 24H, thereby securing bracket 24A to an underlying e.g. concrete or FRP footer or bottom plate.

Bottom plate 16, where used, can be a fiber-reinforced, e.g. fiberglass-reinforced, polymeric structural member, or other material, of such dimensions and mass as to be sufficiently rigid, and having sufficient strength, including bending resistance, to support both the foundation wall and the overlying building superstructure, from an underlying, typically fabricated, base. The underlying, e.g. fabricated, base spreads the weight of the overlying load over the natural support base, namely over underlying, generally undisturbed, soil and/or rock, within the weight-bearing limits of the natural support base. Such fabricated base can be e.g. a settled, compacted bed of stone aggregate, a conventional concrete footer 55 (FIG. 3), or other suitable underlying fabricated supporting base. The specific structural requirements of bottom plate 16, as well as underlying footer 55, depend on the loads to be applied.

For securing the bottom plate to the upstanding wall section using brackets 24A, adhesive can be used at vertical leg 24V instead of, or in combination with, screws or bolts. In some embodiments, a wall system which includes a bottom plate can be used without a footer. In such instance, the bottom plate is sufficiently wide, thick, dense, and rigid, to provide the effective compression and bending support normally attributed to the footer. Thus, whether bottom plate or footer, or both bottom plate and footer, the structure between the load and the natural support base distributes the overlying load over a sufficiently wide area of the underlying natural support base that load per unit area exerted on the underlying natural support base is no more than the load carrying capacity of the underlying natural support base such that the underlying natural support base can support the building load for an indefinite period of time without the building load causing any substantial vertical or lateral movement of the underlying natural support base. Where a footer is used in combination with the bottom plate, the bottom plate need not have as large an area, nor as much rigidity, compared to using the bottom plate without use of a footer, because the footer takes over the function of load distribution to the underlying e.g. soil or rock, namely to the natural support base.

The bottom plate typically extends laterally inwardly into the building beyond the inner surface 25 of inner layer 34 at the main body, and may extend by a distance corresponding to at least the thickness of the building panel which includes studs 23, whereby the area of the bearing surface presented to the footer or the underlying natural support base where no footer is used, including the load presented by studs 23, distributes the overlying load at least over the area of the footprint of the wall as well as over the area represented by the cavities 131 (FIG. 12) between studs 23.

In some embodiments where the underlying footer has a sufficient load bearing capacity, and is sufficiently rigid to distribute the load over the length and the width of the footer, bottom plate 16 can be omitted, such that the bottom of panel 14, namely the bottom ends of main body 14A and studs 23, bear directly on the footer, relying on only the footer to distribute the building load relatively evenly to the underlying natural soil and/or rock base.

The top plate is sufficiently long, wide, thick, and rigid, and sufficiently resistant to bending, to provide a support surface, interfacing with the top of the underlying upstanding wall section, typically including interfacing with both main body 14A and studs 23, to distribute a portion of the load of the overlying building structure, at least regionally, along the length of the underlying wall section. The top plate can conveniently be made from fiber-reinforced polymeric material, or from conventional dimension wood lumber whereby overlying building structures can be conventionally attached to the underlying foundation wall structure at the building site by use of conventional mechanical fasteners such as nails, screws, or bolts, conventionally attached to the top plate. Typically, the top plate includes a conventional double layer of wood, each layer being made using conventional 2×8 wood boards, which are nominally 2-inches (measures 1.5 inches) thick, by 8 inches (measures 7.25 inches) wide.

Referring to FIGS. 1 and 3, once the foundation wall 10 is in place as illustrated in FIG. 1, on a suitable footer (e.g. 55), a conventional ready-mix concrete slab floor 38 can be poured. The concrete slab floor typically extends over, and thus overlies, that portion of any bottom plate 16 which may underlie the foundation wall, and extends inwardly from the inner surfaces of the building panels, including both the inner surface 25 of the main body and the inner surfaces of stud end walls 126. Namely, the concrete slab floor extends to, and abuts against, the inner surfaces of the respective upstanding wall sections 18, panels 14, at inner layers 34 and at studs 23. Accordingly, once the concrete slab floor is cured, inwardly-directed lateral forces, imposed by the ground outside the building, both at the bottom of the wall and by backfill along the height of the wall, pass through wall 10 and are absorbed by the structural e.g. lateral compressive strength of the concrete floor slab 38, as the edge of the slab abuts the inner surface of the foundation wall.

Inwardly-directed lateral forces which are imposed on the foundation wall at or adjacent top plate 20 are transferred to main floor 40 of the building (FIG. 3) at least in part through e.g. brackets 24, 24A, including screws 136. In the embodiments illustrated in e.g. FIGS. 3 and 12, forces imposed on the upper portion of the foundation wall pass from the wall to the top plate, and from the top plate to the floor joists or trusses, with some of the force potentially transferring into any corresponding sub-flooring and/or finished flooring. Such forces are transferred by the stiffness and rigidity of the panel/wall as collectively defined by the interactions of the various structures which define the panel/wall.

In the invention, studs 23 may be, optionally are, fabricated separately from the fabrication of main body 14A of panel 14. Such separate fabrication simplifies the processes for fabricating both the main body and the studs. As explained in more detail following, such separate fabrication also facilitates final assembly of panel 14.

Main Body of the Panel

Figure 4:
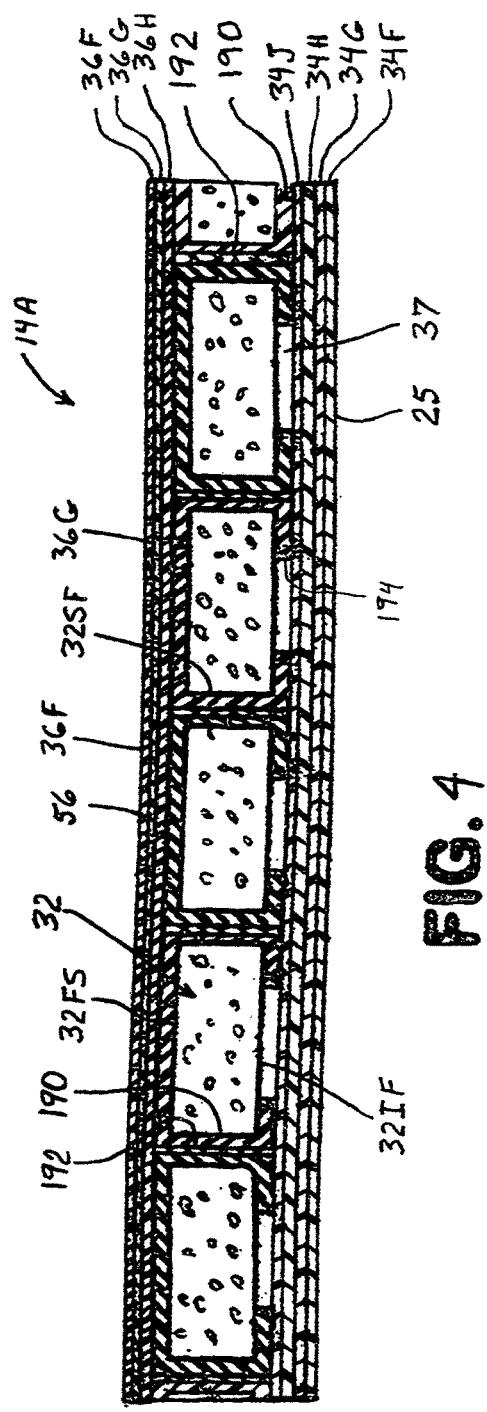
FIG. 4 is a cross-section of a partial length of a main body portion of a building panel used in a wall illustrated in FIG. 1.

As fiberglass reinforced elements, main body 14A includes inner layer 34, outer layer 36, and intercostals 50. Intercostals 50 can be defined at least in part by wrapping layers 190, one of which extends about each of the plurality of foam blocks 32. FIG. 4 illustrates, in cross-section, a portion of the length of a first exemplary main body 14A.

As illustrated in FIG. 4, each foam block 32 has an outwardly-facing surface 32FS, an inwardly-facing surface 32IF, and opposing side-facing surfaces 32SF which extend between the inwardly-facing surface and the outwardly-facing surface. As a wrapping layer 190, a layer of fiberglass is wrapped about each foam block, covering outwardly-facing surface 32FS and the two side-facing surfaces 32SF, and covering limited portions of inwardly-facing surface 32IF. Fiberglass layer 190 is typically a woven roving about 15 ounces per square yard (osy) to about 20 osy, typically about 17 osy to about 18 osy, having approximately equal weights of weft and warp fibers, or a knitted fabric of similar mass. A generous length of a given fiberglass wrapping layer, having a width at least equal to the length of the foam block, is wrapped around three sides of a given foam block. End portions of the fiberglass wrapping layer are drawn about the corners of the foam block where the side-facing surfaces of the foam block meet the inwardly-facing surface 32IF. The end portions of the fiberglass wrapping layer optionally extend away from the inwardly-facing surface of the foam block, as suggested in FIG. 5. Further, end portions of the fiberglass wrapping layer can terminate at the corners of the foam block where side-facing surfaces 32SF of the foam block meet inwardly-facing surface 32IF.

Conventional resin/adhesive is applied to those surfaces of the foam block which are to be covered by the fiberglass or, in the alternative, the resin/adhesive can be applied to the fiberglass wrapping layer, whereupon the fiberglass layer, as wrapped, and after curing of the resin/adhesive, becomes adhered to the respective foam block surfaces. With a foam block so wrapped, any end portions of the fiberglass wrapping layer which extend past the corner of the foam block at surface 32IF may optionally, or not, be adhered to the foam block, whereby inwardly-facing surface 321F may remain exposed. In the alternative, layer 190 can extend across, and be adhered to, the entirety of inwardly-facing surface 32IF as illustrated in FIG. 13.

Figure 5:
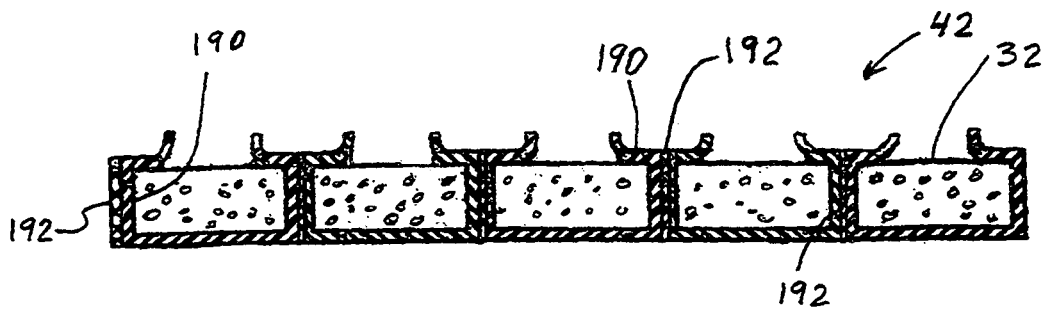
FIG. 5 is a cross-section of a first embodiment of a foam block cluster for use in the main body of a building panel of the invention.

FIGS. 4 and 5 show an optional fiberglass flow medium 192 disposed between respective ones of the foam blocks. A given flow medium 192 extends the full length of the respective foam block and extends from a first location proximate inwardly-facing surface 32IF of the foam block to a second different location proximate outwardly-facing surface 32FS of the foam block. A given flow medium 192 interfaces with the respective wrapping layers 190 which are disposed on respective facing surfaces 32SF of next adjacent ones of the foam blocks in the main body. Flow medium 192 is sufficiently porous to facilitate the flow of resin into the interfacial region between the side-facing surfaces 32FS of the foam blocks and into wrapping layers 190 on the side-facing surfaces of the foam blocks. Flow medium 192 is used when the wrapping layers are dry, namely are not wetted with resin, when the wrapped foam blocks are brought into side-to-side facing relationship with each other, whereby the flow medium facilitates filling, with resin, the interstitial spaces between the foam blocks which are not occupied by fiberglass layers 190 or 192. However, in the embodiments where resin is applied to the sides of the wrapped foam blocks before the sides of the blocks are brought together, flow medium 192 can be omitted.

FIGS. 12 and 13 show first and second exemplary embodiments of panel 14, including studs 23. FIG. 4 shows a portion of the main body of the panel shown in FIG. 12. In FIG. 4, and starting at outer surface 56 of the panel, fiberglass layer 36F is a surface veil which facilitates flow, and lateral dispersal, of resin in outer layer 36. An exemplary fiberglass surface veil for layer 36F is 0.55 osy.

Inwardly from, and next adjacent, layer 36F, is fiberglass layer 36G. An exemplary fiberglass material for layer 36G is 1 ounce per square yard (osy) CSM (chopped strand matt) fiberglass.

Inwardly from, and next adjacent, layer 36G, fiberglass layer 36H is an exemplary 55 osy woven roving, next adjacent block wrapping layer 190. Typically about 95% by weight of the fibers in layer 36H are upwardly oriented along the top-to-bottom height of the panel, e.g. within 15 degrees of vertical, in a vertical building panel. The inventors herein have discovered that such upright orientation of a substantial portion of the fibers provides a significant enhancement to the incremental contribution provided by the fiberglass, to vertical crush strength of the panel. Typical orientation of the fibers in layer 36H is within 10 degrees, optionally within 5 degrees, optionally within 3 degrees, of vertical.

The fraction of fibers which are so upwardly oriented in a building panel of the invention is at least about 50% by weight of the fiber in the building panel, optionally at least about 60%, optionally at least about 70%, optionally at least 80-85%, and up to 95% or more, including all percentages between 50 percent and 95 percent of the weight of the fiber in the panel 14.

Turning next to outer surface 25 of inner layer 34 of the panel, a fiberglass layer 34F is a surface veil which facilitates flow, and lateral dispersal, of resin in inner layer 34. An exemplary fiberglass surface veil for layer 34F is 0.55 osy.

Next adjacent layer 34F is fiberglass layer 34G. An exemplary fiberglass material for layer 34G is 1 osy CSM.

The next layer adjacent layer 34G is fiberglass layer 34H. An exemplary fiberglass material for layer 34H is 55 osy woven roving. As with layer 36H, typically about 50% to about 95% by weight of the fiberglass rovings in layer 34H are upwardly oriented along the top-to-bottom height of the panel, e.g. within 15 degrees of vertical, in a vertical building panel. Typical orientation of fiberglass rovings in layer 34H is within 10 degrees, optionally within 5 degrees, optionally within 3 degrees, of vertical.

The next layer adjacent to layer 34H is fiberglass layer 34J, which is disposed between layer 34H, and the respective wrapped foam blocks 32, and which optionally interfaces with at least portions of wrapping layer 190. An exemplary fiberglass material for layer 34J is 17 osy woven roving. Fiberglass layer 34J is typically a woven roving having approximately equal weights of weft and warp fibers.

In light of the recited orientations in the fibers in layers 34H, 34J, and 36H, and 190, approximately 80 percent by weight of the fiber in main body 14A is in an upright orientation within 15 degrees of vertical in a vertical panel 14.

FIGS. 4 and 12 illustrate an empty space 37 between surface 32IF of the block and the facing surface of layer 34J. As will be understood from the discussion, following, of methods for making main body 14A, such space 37 is shown for illustration purposes only, prior to completion of fabrication of main body 14A, and is imaginary in the fully fabricated main body. Namely, while space 37 may be present when blocks 32 are initially wrapped, the adjacent layers and the respective foam blocks are urged against such space during assembly of the main body, whereby the space is closed, by pressure being applied simultaneously to surfaces 25 and 56 during the process of curing the resin in the main body. As necessary to maintain dimensional thickness consistency between surfaces 321F and 32FS of wrapped foam blocks 32, at least some portion of the foam in a given foam block is compressed by pressure which is applied during the process of fabricating main body 14A, including during the curing of the liquid resin.

FIGS. 5-9 illustrate first, second, third, fourth, and fifth embodiments of block clusters 42, made with blocks 32, which are optionally assembled prior to applying such block clusters to main body 14A during the fabrication of panels 14. FIG. 5 illustrates such cluster in a relatively simplistic assembly. In FIG. 5, five wrapped blocks have been selected for assembly into a block cluster 42. Starting at the left side of the block cluster, the first and second blocks are shown positioned on what will be their bottom sides during fabrication of main body 14A, with both ends of the respective wrapping layers 190 extending upwardly, namely facing in a common direction, with the upstanding sides of the first and second foam blocks facing each other. The wrapping can be so inverted that the end portions of the wrapping layers are, in the alternative, facing down.

In the process of assembling the block cluster as in FIG. 5, a flow medium layer 192 is positioned between the upstanding sides of the respective pair of next adjacent (first and second) foam blocks. Sufficient bonding agent, such as a liquid adhesive or a liquid resin, is applied to the flow medium layer, alternatively to one or both of the respective block wrapping layers 190 at the upstanding sides of the respective blocks, to bond the flow medium layer to the wrapping layers, and the respective upstanding sides of the foam blocks are urged together with the now-wetted flow medium layer 192 between the two respective wrapping layers at the upstanding sides of the respective foam blocks. However, the amount of bonding agent is limited such that the flow medium layer 192, after bonding to layers 190, retains its functionality to facilitate flow of resin to layers 190 at the upstanding sides of the blocks. The blocks are held firmly against each other until the bonding agent is cured. The quantity of bonding agent used to bond the flow medium layer to the wrapping layers may be insufficient to expel all air pockets from between the upstanding sides of the respective foam blocks. Once the bonding agent is set/cured, the bonding agent holds the combination of the wrapped blocks and the flow medium to each other. The process is repeated, adding a third block at the upstanding side of either the first or second block, with a second resin-wetted flow medium layer positioned between the third block and the respective second or first block. Additional foam blocks are added to the block cluster in the same manner, namely positioning foam blocks with their upstanding sides facing each other, positioning a flow medium layer between the facing upstanding sides of e.g. an end block, in a block cluster-in-the-making, and an additional foam block, adding bonding agent to either or both of the flow medium and the upstanding sides of the respective wrapping layers on the respective foam blocks as the flow medium and the wrapped blocks are being assembled to each other. While five blocks are shown in the block cluster illustrated in FIG. 5, fewer or more than five blocks, namely any number of foam blocks, are contemplated in the invention. What is important is that clusters of at least two blocks, and up to e.g. five, or ten, or twenty, or more blocks, are assembled into block clusters which can be readily handled, whether manually or by machine manipulation, for insertion into the process for assembling main body 14A.

Figure 6:
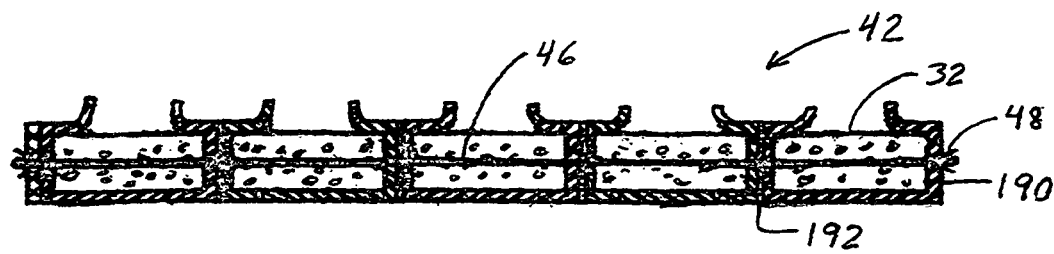
FIG. 6 is a cross-section of a second embodiment of a foam block cluster for use in the main body of a building panel of the invention.

In some embodiments, a mechanical keeper is added to the block cluster as a mechanical element, which is used to assist the resin/adhesive in keeping together the blocks in the block cluster. In FIG. 6, a keeper such as a thread or rod 46, or other elongate mechanical device, extends through each of the blocks 32, as well as through the respective layers 190, 192. A capture device 48, such as an inverted spring, a "T" structure, or a clamp, at each end of the keeper, holds the elongate mechanical device in tension, thus to provide a mechanical securement of the blocks to each other as the block cluster 42. Typically, a plurality of such keepers are disposed along the length of the block cluster, to collectively hold the blocks to each other along the lengths of the respective blocks. In the alternative, a single keeper, or a small number of keepers, extend through the block cluster, and relatively rigid capture devices on the opposing ends of the keeper or keepers extend far enough along the lengths of the outer surfaces of the end blocks to collectively hold the blocks to each other in the block cluster and along the lengths of the respective end blocks.

Figure 7:
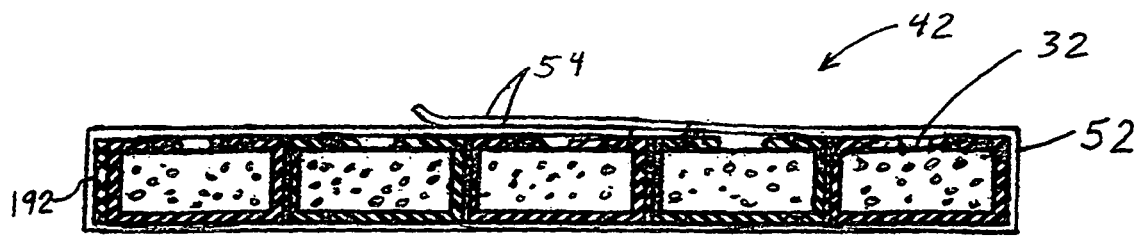
FIG. 7 is a cross-section of a third embodiment of a foam block cluster for use in the main body of a building panel of the invention.

In FIG. 7, a second embodiment of a mechanical keeper is illustrated as a securing layer 52, of fiberglass or other compatible material, which securing layer extends about the cluster of blocks, with the length of the securing layer extending about the collective widths of the respective foam blocks. The securing layer is wrapped tightly about the cluster of foam blocks and is secured to itself at overlapping end portions 54 by e.g. adhesive, or by hook and loop fasteners, or by other securing mechanism. Width of securing layer 52 can extend the entire lengths of the foam blocks or a portion of the lengths of the foam blocks. Securing layer 52 typically does not wrap around the ends of foam blocks 32 whereby the ends of foam blocks 32 are generally exposed, as not requiring any such securement. In the alternative, multiple securing layers 52 of lesser widths, e.g. 6-12 inches width, can be disposed toward or adjacent opposing ends of the blocks in the cluster, with e.g. one or more additional such securing layers disposed toward the middle of the lengths of the blocks. Restated, one or more securing layers 52, namely any desired number of securing layers, can be disposed, typically parallel to each other, side by side or spaced from each other, and distributed along the lengths of the blocks in the block cluster, each such securing layer extending generally perpendicular to the lengths of the blocks, and drawn snug around the cluster of blocks, thereby to collectively secure the cluster of blocks to each other in the disposition shown generally in FIG. 7, for example, while such block cluster is being manipulated during fabrication of a main body 14A. Widths of the respective securing layers are selected to collectively secure the cluster of blocks to each other along the full lengths of the respective foam blocks.

Figure 8:
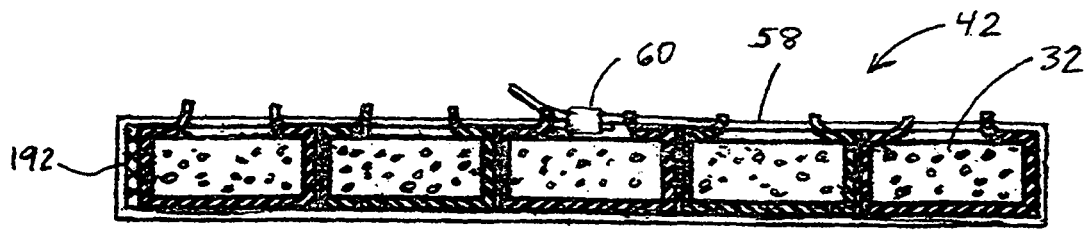
FIG. 8 is a cross-section of a fourth embodiment of a foam block cluster for use in the main body of a building panel of the invention.

In FIG. 8, in a third embodiment of a mechanical keeper, the securing layer or layers 52 have been replaced by e.g. conventional plastic or metal strapping 58, which is e.g. about 0.5 inch wide to about 1 inch wide. The strapping is drawn snugly about the cluster of blocks, but not so tight as to substantially change the rest dimensions of the foam blocks. End portions of the strapping are secured to each other using e.g. conventional strap clamps 60. Depending on the lengths of the foam blocks, multiple such straps are disposed, typically parallel to each other along the lengths of the foam blocks thus to collectively assist the adhesive/resin in securing the blocks, in a given block cluster, to each other along the full lengths of the foam blocks.

Figure 9:
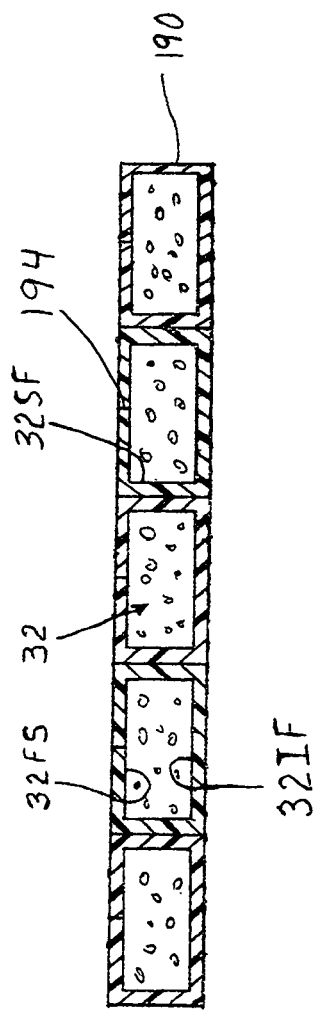
FIG. 9 is a cross-section of a fifth embodiment of a foam block cluster for use in the main body of a building panel of the invention, where adhesive has been applied to the wrapping layers at the sides of the foam blocks as part of assembling the foam block cluster, whereby no flow medium need be employed between the respective next adjacent foam blocks.

In FIG. 9, resin/adhesive is applied to one or both sides of a given wrapped foam block, thereby wetting the respective side or sides of the foam block with resin/adhesive before that wetted wrapped foam block is brought into facing relationship with a next adjacent foam block as part of the process of assembling the block cluster. The wrapped foam blocks having the so-wetted sides can then be stacked vertically, in a suitable jig, wetted sides of a given wrapped foam block facing sides of next adjacent foam blocks while the resin/adhesive cures.

Figure 17:
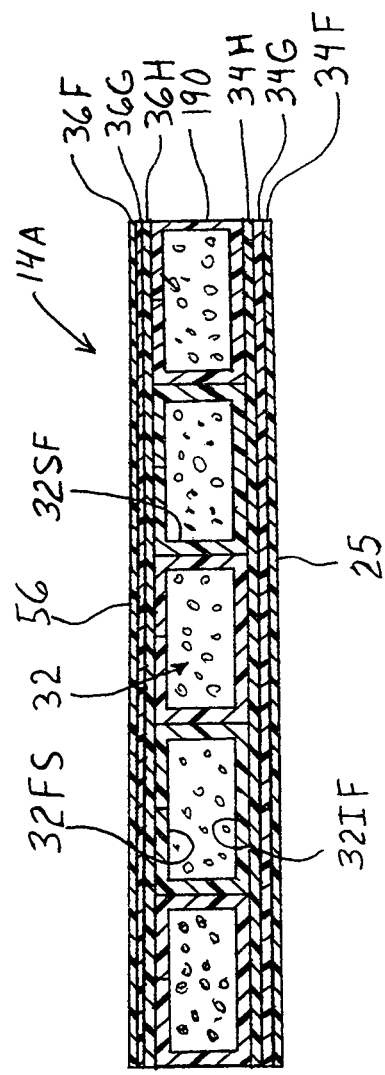
FIG. 17 is a cross-section of a portion of a second embodiment of the main body of a building panel of the invention as in FIG. 4 wherein resin/adhesive has been applied to the wrapping layers at the sides of the foam blocks as part of assembling the foam block cluster, whereby no flow medium need be employed between the wrapped foam blocks.

The sides of the wrapped foam blocks are wetted with a sufficient quantity of adhesive/resin that no further resin need be added between the wrapped foam blocks during the process of assembling main body 14A of the panel 14. Accordingly, where the wrapped foam blocks are so wetted during assembly of the wrapped foam blocks to each other, flow medium 192 can be, typically is, omitted, a savings of material cost and a savings of a process step. Accordingly, FIG. 9, and similarly FIG. 17, are devoid of flow medium 192.

In an exemplary main body 14A as illustrated in FIG. 4, foam blocks 32 are nominally about 3 inches thick to about 4 inches thick, about 4 inches wide, and about 112 inches long, while the respective layers 34 and 36 are each about 0.08 inch thick to about 0.30 inch thick. Each intercostal 50 is defined by respective portions of wrapping layers 190 associated with respective paired ones of foam blocks 32 in combination with the respective flow medium layers 192. For purposes of facilitating visualization of the ends of layer 190 on the inwardly-facing surfaces 32IF of foam blocks 32 in FIGS. 4-7 and 12, space 37 is shown at the inwardly-facing surface of each foam block 32 between the facing ends 194 of respective layers 190. Those skilled in the art will recognize that, in light of limited movements and dimensional changes in foam blocks 32 and wrapping layers 190 during the process of fabricating main body 14A, the spaces 37 shown at the surfaces of the foam blocks are actually of nominal, if any, thicknesses whereby, during the process of compressing the layers together and curing the resin, e.g. in an oven, the pressure causes the fiberglass of layers 34H and 34J to move toward the surfaces 32IF of the foam blocks. Under the same influence of pressure, the ends of layer 190 which wrap the corners of foam blocks 32 at that surface become compressed against surface 32IF, and resin fills any remaining voids proximate what is illustrated as space 37, whereby the illustrated spaces are in fact fully occupied by fiber and resin, and do not exist as spaces in the fully fabricated and cured main body.

Referring to FIGS. 1-4, in general, the inner and outer layers of the wall section are illustrated as fiberglass-reinforced resin layers, full height and full length of the wall section. As illustrated, the foam between layers 34, 36 is in the form of e.g. unitary blocks of foam which extend the full height of the panel and, in combination with the wrapping layers and the flow medium layers, fill the entirety of the space between the inner and outer layers 34, 36.

Inner layer 34 and outer layer 36 are e.g. between about 2 mm and about 8 mm (between about 0.08 inch and about 0.3 inch) thick. Typical thicknesses of the inner and outer layers are about 0.12 inch to about 0.25 inch, optionally about 0.09 inch, 0.10 inch, 0.11 inch, 0.12 inch, 0.13 inch, 0.14 inch, 0.15 inch, 0.16 inch, 0.17 inch, 0.18 inch, 0.19 inch, 0.20 inch, 0.21 inch, 0.22 inch, 0.23 inch, 0.24 inch, 0.25 inch, 0.26 inch, 0.27 inch, 0.28 inch, 0.29 inch. Thicknesses of each of layers 34, 36 are generally constant within manufacturing tolerances.

Thickness of an intercostal 50, including first and second layers 190, and the optional flow medium layer 192, is about 0.07 inch to about 0.20 inch such as 0.08 inch, 0.09 inch, 0.10 inch, 0.11 inch, 0.12 inch, 0.13 inch, 0.14 inch, 0.15 inch, 0.16 inch, 0.17 inch, 0.18 inch, or 0.19 inch. Typical thickness of intercostals 50 is about 0.1 inch.

Allowing for the mass of the wrapping layer 190 at block surface 32FS, it is seen that the mass of fiber is illustrated as being approximately the same in both the inner and outer layers, providing an approximate balance of crush strength between the inner and outer layers. While such balance is not necessary, such balance is typical.

Where structural requirements dictate, the load carrying capacity of the panel can be modified by increasing or decreasing the quantity of fiber in the inner and/or outer walls as well as in the intercostals between the foam blocks, namely by increasing, or decreasing, the masses of the respective FRP components, especially mass/weight of fiber. And typically, where the mass of the fiber is changed, e.g. increased or decreased, the volume of the voids in the fiber changes respectively, e.g. increases or decreases. In the overall structure of all such layers, the resin content in a given layer is that amount which readily completely fills all voids in the respective fiber layer or layers with resin.

The Studs

Figure 10:
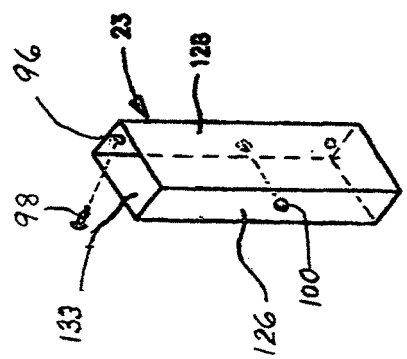
FIG. 10 is a pictorial line rendering, for illustration purposes only, of a stud for use in a building panel of the invention.

FIG. 10 shows a pictorial view of a short version of a typical embodiment of stud 23 of the invention. Stud 23 has first and second opposing end walls 126, and first and second opposing legs 128 connecting the end walls to each other, whereby a stud 23 of FIG. 10 represents an elongated enclosed rectangular cross-section body, encompassing hollow space 133, and open at opposing ends of the stud.

FIGS. 12 and 13 illustrate hollow, fiber-reinforced polymeric studs 23 of FIG. 10 assembled into building panels representative of the invention.

Studs 23 can be made by wrapping one or more e.g. concentric layers of fiberglass sheet on itself, e.g. on a mandrel, until the desired cross-sectional shape and wall thickness are obtained, and impregnating the so-wrapped fiberglass layers with a curable resin. As such fiber-reinforced stud structures, there can be mentioned 4-sided hollow rectangular structures as in FIG. 10, or the studs can be filled with thermally-insulating foam. However, the primary thermal insulation effect of the panel 14 is provided by main body 14A of the panel, whereby thermal insulation contributions from studs 23 are typically not needed. Thus, studs 23 may be, typically are, hollow rectangular tubes.

In the embodiments of panels 14 which are illustrated in FIGS. 12-13, studs 23 run the full height of main run wall section 22, and extend from inner layer 34 inwardly, and away from outer layer 36, a desired distance so as to provide a desired increment to structural strength of building panel 14, as well as to provide a desired depth to channels 131 between end walls 126 of the studs and surface 25 of inner layer 34, thereby to provide for utility runs as well as insulation options between studs 23, in channels 131.

Another method of making a stud is by pultruding the stud as a hollow rectangle having a cross-section replicating the size and shape of a conventional wood 2×4 stud. Thus the exemplary pultruded stud has nominal outside cross-section dimensions of 1.5 inches by 3.5 inches, whereby such stud replicates the size and shape of a conventional 2×4 wood stud. In such instance, such stud can satisfy the dimensional specifications of a conventional wood stud, and can thus be used anywhere the attributes of stud 23 of the invention is preferable over the attributes of a 2×4 wood stud. By so sizing the studs, pultruded studs of the invention can be used in pre-existing conventional structural building designs, architectural plans, and specifications, including remodel jobs, whereby conventional fiberglass batt insulation fits conventionally into channels 131 and thereby provides the normal insulating value designed into such fiberglass insulation.

A typical such pultruded stud is about 60 percent by weight fiberglass woven roving with a surface CSM and/or surface veil, and about 40 percent by weight e.g. polyester resin.

Figure 11:
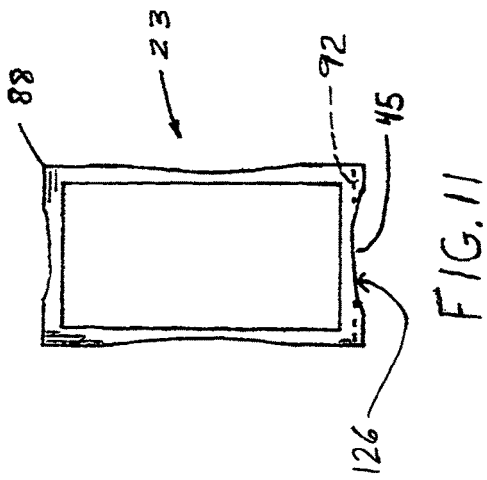
FIG. 11 is an enlarged end view of the stud of FIG. 10, illustrating recesses which are common in the walls of such studs as the studs exit the pultruder in a pultrusion process.

As pultruded, wall thickness cross-section of any given stud is thicker at and adjacent the corners 88 of the stud as illustrated in FIG. 11. The respective stud wall is correspondingly thinner at mid-portions 45 between the stud corners.

The studs can be adhesively mounted to inner surface 25 of inner layer 34, using conventional construction adhesive 194 (FIGS. 12, 13), with sufficient adhesive strength for the studs to bear the overlying building load as applied to the building panel without the studs separating, delaminating, from the main body at the adhesive interface. In some embodiments, the studs are specially prepared for such adhesive mounting to the main body. In such preparation of a given stud, a stud end wall 126 is selected to be mounted to surface 25 of the inner layer of main body 14A. The selected stud end wall is sanded, or otherwise treated such that the wall thickness is substantially constant across and along that end wall 126. Namely, after such treatment, the respective stud end wall is substantially flat; and typically that particular stud end wall, after such treatment, has a moderately textured surface. Such treatment may include exposing some of the fiber in the respective stud wall, which exposed fiber can contribute to the roughness of the outer surface of the respective stud end wall.

In the embodiments where the stud end wall is so prepared, the first step in the stud end wall preparation is to select that stud end wall 126 which will face, and be adhesively mounted to, main body 14A at surface 25. The selected stud end wall 126 can be sanded with conventional sandpaper or other abrasive surface, thereby reducing the thickness of the stud wall at and adjacent the stud corners, typically removing enough material that the wall thickness at and adjacent the stud corners on that end wall is no thicker than the respective wall thickness at the mid-portion 45 of the respective stud end wall. Such reduction of wall thickness, at the respective stud corners, is indicated in wall 126 (FIG. 11) by dashed horizontal line 92 at and adjacent the respective corners of end wall 126. Such sanding can be done with, for example and without limitation, conventional 80 grit sandpaper.

In order to ensure a flat surface, where so desired, and to ensure moderate surface texturing across the full width of the selected stud end wall 126, the thickness of end wall 126 is reduced a nominal amount, e.g. 0.01 to 0.02 inches, at the thinnest, mid-portion 45, of the wall, thereby providing a moderately textured, and nominally flat, wall surface along the full length and width of the selected stud wall. The degree of flatness, both length and width is that flatness which will provide an adhesively consistent surface for adhesively mounting the stud, at end wall 126 to the main body along the full height of the main body. Given that the stud is typically pultruded, with both stud end walls and both stud legs 128 originally having nominally equal thicknesses, the so-prepared stud end wall 126 is overall thinner than the remaining end wall and two legs 128. Typical difference in the thickness between the selected and treated stud end wall 126, and the remaining stud end wall and legs, is about 0.03 inch to about 0.08 inch proximate the respective stud corners 88.

FIGS. 12 and 13 illustrate first and second embodiments of a portion of the length of a finished building panel 14, wherein studs 23 have been adhesively mounted to main body 14A by an adhesive layer 94.

In addition to the use of adhesive, mechanical fastening is optionally used to fix a given stud in position at a desired location on main body 14A while the liquid resin/adhesive is curing/hardening so as to become a plastic solid, as suggested at the shortened stud illustrated in FIG. 10. As seen in FIG. 10, a mounting hole 96 is drilled through stud end wall 126 at locations minimally displaced (e.g. 1 inch) from each of the respective ends of stud end wall 126. First and second mounting screws 98 are driven into and through the respective mounting holes 96 and into the main body of the panel, thereby mechanically securing the ends of the stud to the main body. In the alternative, self-tapping screws may be driven at the respective locations near the ends of the stud without first drilling holes 96. In some embodiments, an access port 100 is drilled in the stud end wall 126 which opposes the selected stud end wall. A third mounting screw is guided through access port 100 and is driven into and through the selected stud end wall 126 and into the main body opposite access port 100. One or more mounting holes 96 can optionally be pre-drilled through the selected stud end wall 126 at respective one or more spaced locations along the length of the stud. The stud is thus adhesively mounted to the main body by adhesive at adhesive layer 94, and the adhesive mounting is temporarily affixed in location by mechanical fasteners such as screws 98 while the adhesive is setting. Additional screws 98 may be added, as desired, between the mid-length screw and the end screws by providing additional access ports 100, or by using already provided access ports. However, for a stud 9 feet long, the three screws noted above are typically sufficient reinforcement of adhesive layer 94 to temporarily hold a 108 inch long stud in place. Once the adhesive is set, screws 98 can be removed as desired, with no detrimental effect on the joinder of the studs to the main body. Restated, typical function of screws 98 is to temporarily hold the stud 23 in a desired location on surface 25 of the main body while the resin/adhesive 194 is curing, which allows moving, stacking, and similar, handling of panel 14 before the stud/main body resin/adhesive 194 is fully cured. Once the resin/adhesive is substantially cured, screws 98 are no longer needed, and can be removed if and as desired.

In FIG. 12, foam blocks 32 are wrapped with fiberglass wrapping layer 190 on three sides, and the fourth side is partially wrapped. By contrast, In FIG. 13, the foam blocks are wrapped by wrapping layer 190 on all four sides. The embodiments of both FIG. 12 and FIG. 13 are exemplary of some embodiments of the invention.

Any top plate or bottom plate can be made from conventional e.g. wood materials, with suitable waterproofing as appropriate for the intended use. Such wood is, before use in a such foundation wall treated to inhibit growth of organisms which consume, or otherwise cause deterioration, of wood.

Top plate 20 is typically a two-part plate. A first length of wood dimension lumber can be secured to panel 14 using e.g. conventional hurricane brackets 24 e.g. at each stud 23, secured to both the stud and the overlying top plate lumber by screws or other mechanical fasteners 136 as illustrated in FIG. 3. In the alternative, the first length of wood dimension lumber can, for example and without limitation, be secured to panel 14 using angle brackets 24A illustrated in FIGS. 3 and 14. A second, corresponding, length of wood dimension lumber of specification similar to the first length of wood dimension lumber is typically then secured, in overlying relationship, to the first length of wood dimension lumber using screws or other mechanical fasteners.

Bottom plate 16 is similarly secured to panel 14 by such hurricane brackets or angle brackets, or the like, each such bracket being secured to both the bottom plate, and either a respective stud or the main body, by screws.

In order to avoid issues of potential deterioration of the wood as a result of the wood being in contact with moisture in the ground, typically, but not necessarily, the bottom plate, when used, is a fiberglass-reinforced resinous composite, for example a pultruded plate, of sufficient length, thickness, width, and rigidity to provide the level of weight bearing capacity, and weight-distribution rigidity, anticipated as being appropriate, for supporting the overlying structure to be supported. However, in some embodiments, the bottom of the wall structure is placed directly on the footer, whereby no bottom plate is used.

As used herein, all fiberglass/resin composite structures, such as inner layer 34, outer layer 36, intercostals 50, bottom plate 16, top plate 20, studs 23, and the like, can be fabricated using known techniques of dry or pre-impregnated fiberglass blanket manipulation and construction, including resin impregnation of such materials, chop spray processes, vacuum infusion processes, pultrusion processes, open mold wet lay-up processes, or other processes known for making fiber-reinforced composites, in order to make the desired 3-dimensional shapes. Such techniques can be used, for example, to make building panel 14, bottom plate 16, top plate 20, studs 23, brackets 24A, and the like.

Structural building panels of the invention can be manufactured in any standard dimensional sizes, as well as in custom size combinations desired for a particular building project. Thus, for example and without limitation, such panels can have heights of about 3 feet to about 5 feet, typically about 4 feet, which accommodates use of the panels in frost walls and crawl spaces; or heights of about 8 feet to about 10 feet, typically about 9 feet, which accommodates use of the panels in standard-height basement walls and standard-height above-grade walls.

Wall section thickness "T" (FIG. 12), and thus the wall thickness in the main run wall section, namely thickness of main body 14A of the respective panels, is defined without respect to the dimensions of studs 23, and generally stops at surface 25, namely in channels 131 between the studs. Thickness "T" can be as little as about 2 inches between the inner and outer surfaces of the wall, to as much as about 8 inches or more, as measured between the outer surface 25 of layer 34 and the outer surface 56 of layer 36. Wall thickness "T" is typically about 3 inches to about 6 inches, more typically about 3 inches to about 5 inches, optionally about 3.75 inches. A preferred dimension for studs 23, in the invention, is 1.5 inches wide by 3.5 inches deep, namely the nominal dimensions of a wood 2×4, the studs being spaced 16 inches on center, whereby panels/walls of the invention present channels 131 between the studs which receive conventionally-dimensioned fiberglass batt insulation according to dimensions specified by the fiberglass insulation manufacturer.

In order to achieve a desired level of panel crush resistance and lateral bending resistance, and to accommodate conventional insulation material, stud depth, from inner surface 25 of the main body to the remote stud wall is typically at least 3 inches, optionally 3.5 inches. Such typical stud depth assists in providing desired bending resistance and vertical crush resistance to the panel, and may be instrumental in urging the panel/wall to flex outwardly, against the lateral soil load when loaded with a downwardly-directed overlying load. Additional bending resistance can be obtained through the use of studs which have even greater depths, or greater width, inward from the inner layer. Thermal insulation properties can be provided in the respective wall by adding conventional insulation material in channels 131, namely between next adjacent ones of studs 23 at the inner surface 25 of the panel, as well as by providing insulating fill material, e.g. foam or fiberglass batt type insulation, in the studs, themselves.

Thickness "T" greater than 8 inches is generally not needed in order to satisfy structural demands or thermal insulation specifications of conventional low-population-density residential housing. However, in some instances, where additional thermal or structural specifications apply to the building panels, then thickness "T" greater than 8 inches is contemplated.

Length of a panel 14 is limited only by transportation capabilities. For example, such panel can be as long as the length of the truck bed which will transport the panel to the construction site. Thus, length is generally limited to about 40 feet, but can be shorter or longer as desired and where suitable transport is available. Relatively longer panels can be cut for length. Typical lengths of the panel, as contemplated to be manufactured in mass production, are between about 6 feet and about 40 feet, and where transportation is not a limitation, up to about 50 feet, up to about 60 feet, up to about 70 feet, or up to about 80 feet, and all length increments between about 6 feet and about 80 feet. However, since an advantage of the panels is their limited weight such that the panels can be installed below grade and at and above grade level with use of only a light-duty crane, the lift capacity of the available crane, such as e.g. about 5000 pounds, may control, whereby length is in some embodiments limited to lengths which can readily be handled by such light duty crane.

In the instance where the length of a wall section is relatively shorter than e.g. 40 feet, extending in a given direction, relatively shorter lengths of panel 14, or panel sections, may be desired whereby the lengths of the respective panels or panel sections may be correspondingly shorter. Thus, panels as short as about 4 feet or less, about 6 feet, about 8 feet, about 10 feet, about 15 feet, about 20 feet, and about 24 feet, and all lengths in between, are contemplated, still with as little as 3-5 feet in height, and optionally up to about 8-10 feet in height, or more, in order to function either as a frost wall or as a full-height first story, e.g. foundation, wall, or a custom-height wall.

The structural building panels of the invention provide a number of advantages. For example, the panels can be manufactured in a continuous length, and cut to any desired length for shipping, which may be a generic length, for example 10 feet, or 20 feet, or 24 feet, or 40 feet, or whatever length or lengths is or are desired, such as for a particular construction project. The length needed for a particular portion of a building wall can be cut, with e.g. a conventional ring saw, from a generic-length building panel, at the construction site, to meet specific needs, or can be cut to specific length at the panel manufacturing site, or at situs of a fabricator or other distributor. Thus, if a shorter length panel is needed for a particular portion of the wall, the needed length can be cut from e.g. a 40-foot long, or other length, section of panel 14. If a longer length piece is needed, either a longer length panel can be fabricated as a unitary product at the panel-manufacturing facility, or two or more panels can be joined together using suitable straight-run connectors, or corner connectors, as suitable for the particular assembly to be made. The respective building panels can be cut to length, using e.g. a circular saw, a ring saw, or a reciprocating saw, employing e.g. a masonry blade, and such cut panels can be assembled to each other at the construction site using adhesively mounted, or resin mounted, connectors and/or mechanical fasteners.

Because the wall assembly is made primarily from fiber, resin, and foam, the pounds per cubic foot mass, and thus the unit weight per foot of length of the wall assembly is relatively small compared to a concrete wall of corresponding dimensions. For example, a building panel 20 feet in length, 9 feet in height, and having a main body which is nominally 3.75 inches thick, weighs about 1100-1400 pounds, including studs 23, namely about 55-68 pounds per foot length of the panel, and 6.1-7.6 pounds unit mass for each foot of height of such one-foot length. A typical foundation for an average single-family residence in the USA is about 160 feet in length. A such foundation, made with panels of the invention, thus weights a total of about 8800-11000 pounds/3990-4990 kg whereas a concrete foundation for the same single-family residence weighs about 150,000 pounds/68,000 kg.

Many natural soil bases have a limited load bearing capacity per unit area. The relatively lighter weight of panels of the invention, relative to concrete, allows for increased building load per square foot of building bearing on the underlying soil base, alternatively for less footer area.

The invention contemplates a range of such length/height unit mass of, for example and without limitation, about 2 pounds to about 18 pounds per foot of height per linear foot of length of such building panel, and all incremental masses in between.

Rough openings for windows 27 and/or doors 29, illustrated in FIG. 1, can be cut on site using the above-noted masonry type blade. Accessories, and other connections between elements of the wall and between the wall and other building elements, can be mounted to the wall by drilling and bolting conventional building construction elements to the building panel, using conventional fasteners, or by use of self-tapping screws and other fasteners driven into the building panel, or by using known construction adhesives and resins formulated for use with fiber-reinforced polymeric materials. Conventional screws or conventional bolt-nut combinations can be used for typical attachments and connections whereby the screws and/or bolts facilitate or enable transfer of at least a portion of the overlying building load from an overlying building member to an e.g. underlying foundation wall which uses building panels of the invention. While screws and other mechanical fasteners are suitable for use as connectors/fasteners, conventional and other construction adhesives and resins known for use with fiber reinforced polymeric structures can be used as alternatives or in combination with mechanical fasteners.

In general, all the space between inner surface 25 of main body 14A of the building panel and outer surface 56 of the main body is occupied by layers 34, 36, and 50, and the foam blocks, whereby little, if any, of the space between layers 34 and 36 is not occupied by any of the above-recited panel materials. By so generally filling the space between layers 34 and 36, and reinforcing the panel using the crossing intercostal webs 50, all of the panel members are fixed in their positions relative to each other, and the panel is sufficiently dimensionally stable under designed loading conditions to satisfy building codes and specifications, Laterally-directed loads imposed on the panel, from outside the building, whether subterranean ground loads or above-grade e.g. wind loads, are transferred from outer layer 36 and distributed among the other members of the panel. Respective portions of layers 34, 36, and 50, along with studs 23, share in the support of any one e.g. vertically-directed or horizontally-directed load. The resulting panel is stiff, rigid, and sufficiently strong to support all loads anticipated for e.g. a low-population-density residential dwelling, including severe weather loads to which the building is expected to be typically subjected under normal use environments, including normal seasonal environmental extremes in the geographical location where the panel is expected to be used.

Panels of the invention can be joined to each other using any of a variety of joinder structures known in the art such as "H" brackets, "L" brackets, and more complex-shape brackets, secured to the respective panels by adhesives or curing resins. Such joining of the wall panels to each other can be mechanically supplemented by driving e.g. screws through such brackets and into and through inner and/or outer layers 34, 36 of the respective panels.

Bracket 24A (FIG. 14) is similarly used to attach the panel to either a bottom plate, or to the footer. For example, vertical leg 24V can be used to attach bracket 24A to inner layer 34 using mechanical fasteners, while top flange 24H, now at the bottom of bracket 24A, can be used to attach bracket 24A to the bottom flange or, where no bottom flange is used, to attach bracket 24A to the underlying footer. Accordingly, bracket 24A can optionally transfer a portion of the overlying building load from the panel 14/wall section 22 to the underlying bottom plate or footer.

In residential construction, a typical maximum downward-directed structural load experienced by an underlying e.g. foundation wall averages about 3000 pounds per linear foot to about 5000 pounds per linear foot. The limit for such load is typically defined by the underlying natural base, namely soil or rock, or otherwise. In buildings contemplated by the invention, building panels 14 are primary structural members which carry the bulk, optionally all, of such building structure load which is ultimately imposed on the underlying natural base by the building. The downwardly-directed load is typically applied to the full width of the wall at the top of the wall, and can be applied, at varying intensities, anywhere along the length of the wall.

In panels of the invention which include studs 23, which panels are subjected to a downwardly-directed top-to-bottom load, distributed over the thickness of the panels, the panels deflect under such load in a direction toward the outer layer of the panel, namely toward the soil back-fill load. The bending resistance of the building panel limits the horizontally-directed bending at the locus of maximum horizontal underground loading, accommodating bending of no more than L/120 when supported in accord with ASTM E72. The vertical crush resistance and the horizontal load bending resistance can be designed for greater or lesser magnitudes by specifying, for example and without limitation, density of the included foam; thickness of layers 34, 36, 50; use and parameters of additional reinforcement layers and/or intercostals, panel thickness, spacing of the studs, and/or length of stud legs 128 extending away from the main body, or thickness "T" of the panel in combination with depth of the studs, as well as fiber orientation. For example, greater thicknesses of inner layer 34, outer layer 36, and/or intercostals 50, e.g. up to about 0.5 inch, or about 0.75 inch, or more are contemplated where the overlying downwardly-directed loads, or the anticipated lateral loads, suggest use of such thicker cross-sections.

Above-ground side loads, such as wind loads, are less than typical horizontally-directed soil loads. Accordingly, the absolute bending resistance capabilities/specifications for building panels intended for above-ground applications may be less than the capabilities/specifications for below-grade loads. However, the L/120 capacity performance criteria are the same while contemplating lesser-intensity ultimate loads.

The Fiber

The reinforcing fiber materials used in products of the invention can be selected from a wide variety of conventionally available fiber products. Glass fiber is being illustrated in the general description of the invention, and is believed to be the currently most cost effective material. Other fibers which are contemplated as being acceptable include, without limitation, carbon fibers, Kevlar fibers, and metal fibers such as copper and aluminum, including nano-size embodiments of such fibers. Other fibers can be selected to the extent their reinforcing and other properties satisfy the structural demands of the building panel in applications for which the panels are to be used, and so long as the fibers are not pre-maturely degraded in the use environment contemplated for the respective building panels.

The lengths, widths, and cross-sectional shapes of the fibers are selectable according to the demands of the structures in which the building panels are to be used, and the processes which are used in fabricating such building panels. The overall fiber specification includes multiple fibrous elements and is also known as the fiber "schedule". A given FRP layer e.g. 34, 36, 50 typically includes multiple individually-identifiable fibrous layers which, permissively, but not necessarily, may be attached to each other e.g. by stitching, by weaving, by fiber entanglement, or by other means.

A given fiber layer can be a woven roving, a chopped strand matt (CSM), a knitted fabric, a surface veil, or a combination thereof. Where substantial tension is to be applied to the resin/fiber construct during fabrication of the main body, knitted fabric is preferred for its relatively more limited stretch properties.

The inventors herein have discovered that the positioning of the fibers relative to each other, and the orientations of the fibers, as part of the "fiber schedule" have a substantial affect on the vertical crush strength/resistance, as well as the degree of horizontal deflection, of an upright wall when an overlying load is applied. An exemplary sheet of fiber is a fiberglass cloth having a first layer wherein about 80-85% of the glass is continuous fibers oriented in a first direction as in layers 34H and 36H wherein about 90 percent to about 95 percent of the glass by weight is so oriented, and the remainder of the glass, also typically continuous, is oriented in a second direction perpendicular to the first direction, with the predominant fiber direction in an upstanding, e.g. vertical, such wall being directed generally vertically between the top of the wall and the bottom of the wall. Any given wall will have its specified fiber schedule, addressing the fiber which is used in each FRP layer, in each portion of the length of the wall, e.g. wrapping layers 190 around foam blocks 32 as well as the fiber materials/sub-layers which are used in the inner and outer layers.

Typically, at least about 50 percent by weight, optionally at least about 60 percent by weight, optionally at least about 70 percent by weight, optionally at least about 80 percent by weight, of the fiber is continuous fibers which are oriented in the top-to-bottom direction in the panel. Specifically, the continuous fibers which are oriented top-to-bottom, which may be up to about 90-95 percent by weight of all the fibers in the panel, are continuous and extend in directions which are within 15 degrees of vertical, optionally within 10 degrees of vertical, optionally zero degrees to vertical, namely the fibers are vertical, when the panel is installed in a vertical orientation as part of a building wall. Accordingly, the fibers typically extend parallel to the vertical orientation of the studs when the panel is installed in a vertical orientation in a building wall.

The Resin

The polymer in which the fiber is embedded in panel 14 can be selected from a wide variety of conventionally available multiple-part reaction-curing resin compositions. Typical resin is a reaction curing 2-part liquid where two liquid parts are mixed together before the resin is applied to the fiber substrate. Third and additional components, such as fillers, can be used in the reaction mixture as desired in order to achieve a desired set of properties in the cured resin. The resin mixture should be sufficiently liquidus to be readily dispersed throughout the fiber schedule thereby to fill all voids in the fiber schedule. Examples of useful reaction curing resins include, for example and without limitation, epoxy resins, vinyl ester resins, polyester resins, acrylic resins, polyurethane resins, phenolic resins, and eco-resins.

An example of an acceptable resin is J941® unsaturated polyester resin as the first part and peroxide-based Cadox L50a as the second part. The J941 polyester resin is available from AOC, Collierville, Tenn. The Cadox L50a peroxide-based second part is available from AkzoNobel, Chicago, Ill.

In light of the resin discussion, description herein, those skilled in the art can now select a suitable resin composition for a given selected process for fabricating main body 14A, and for fabricating studs 23.

For any set of reaction materials which are used to make the reacted product referred to here, a conventional additive package can be included such as, for example and without limitation, catalysts, anti-oxidants, UV inhibitors, fire retardants, fillers, and fluidity-control agents to enhance the process of applying the resin so as to fill substantially all voids in the fiber schedule, to enhance the curing of the resin, and/or to enhance the properties of the finished product, e.g. weather resistance, fire resistance, shore hardness of the finished panel, expansion/contraction of the finished panel, and the like. For example, where fire suppression is a consideration, a fire suppressing material, such as a metal hydrate, can be added to the resin, and mixed in thoroughly, while the resin is in its un-reacted liquid condition. A typical such fire suppressing material is alumina tri-hydrate. The amount of fire suppressing material to be used, if any, can be determined by testing sample structures using known accepted test procedures. Such fire suppressing material can, for example and without limitation, be used in inner layer 34 and omitted from outer layer 36 and intercostals 50; or the same resin composition can be used throughout the main body and/or throughout the whole building panel.

The Resin/Fiber Composite

The resin/fiber composite is addressed herein as a 2-part composite where the first part is the fiber, e.g. fiberglass, and the second part represents all non-fiber components of the composite. Thus, the second part, generally referred to herein as the resin, includes not only the chemically reactable resin components which react in forming the set/hardened resin, but also all other materials which are included in the resin mixture in the fluid state of the resin before the resin is combined with the fiber. Thus, this second component includes, without limitation, the various additives which are added to the materials which chemically react to "set" or "cure" the resin, as well as fillers and any other materials which do not chemically participate to any great extent in the "setting"/curing reaction(s) wherein the resin transitions from a liquidus phase to a generally solid plastic phase.

In general, a dry fiber substrate, such as a woven cloth, or a knitted fabric, or a fiber matt, or a surface veil, or a combination of the foregoing, is used as the fiber base for structural portions of layers such as layers 34, 36, and intercostals 50; as well as for all other structural FRP elements of the invention such as studs 23, and brackets 24. Since it is an objective of the invention to fill substantially all voids in the fiber substrate with resin, enough resin is added to the fiber substrate to fill all such voids, whereby there should be no air inclusions, or so few air inclusions as to have no substantial effect on the physical or chemical stability, or the physical properties, or the quality appearance, of a building panel or other structure built with such resin-impregnated fiber-based layers. Overall, the glass/resin ratio is as high as can be achieved, without leaving any significant, deleterious voids in the resultant layer once the resin is cured.

Given the focus on minimizing voids, the resultant structural layer product, e.g. layer 34, 36, or 50, is about 30 percent by weight to about 65 percent by weight, optionally about 35 percent to about 40 percent by weight, fiberglass, and correspondingly about 70 percent by weight to about 35 percent by weight of the resin composition component. Optionally, the resultant layer is about 35 percent by weight to about 40 percent by weight fiber and about 60 percent by weight to about 65 percent by weight of the resin-based component.

The top and bottom plates, as well as layers 34, 36, and 50 can be made of such polymer/fiber composite. The bottom plate can be any material which can bear the load imposed on the overlying building panel. A typical bottom plate, where used, is an e.g. about 0.18 inch thick to about 0.50 inch thick fiber-reinforced pultrusion, which is sufficiently stiff and rigid to spread the overlying load to the underlying footer generally uniformly along the length and width of the panel. The specific thickness for a given implementation is guided by the load expected to be imposed on the bottom plate.

Top plate 20 can be made of, without limitation, fiberglass-reinforced, or other fiber-reinforced, resinous materials, or other materials such as wood in the shape conventionally used for a top plate, including two-component top plates. It is contemplated that a conventional two-component wood-based top plate, e.g. two conventional 2×8 inch boards, an upper such board overlying a lower such board, serves the purpose adequately, and provides for attachment of overlying wood elements such as wood framing, using conventional fasteners and conventional fastening methods.

The Foam

The purpose of the foam, such as in foam blocks 32 in the main body of panel 14 is generally two-fold. First, the foam provides a certain level of dimensional identity to that respective portion of the construct while the various foam, resin, and fiber elements are being assembled to each other. The final and fixated dimensions are achieved as the resin becomes cured, in the process of making a panel.

Second, the foam in foam blocks 32 provides substantial thermal insulation properties in the resulting building panel construct. In achieving a desirable level of thermal insulation, foam having a density of about 1.5 pounds per cubic foot (pcf) to about 8 pcf, optionally about 2 pcf to about 5 pcf, is selected. Foams less dense than the recited range of densities may not possess sufficient rigidity to remain dimensionally stable within the construct while the panel is being assembled and cured. Foams more dense than the recited range typically have more structural strength, but provide less than the desired level of thermal insulation, and are more costly. In general, the foams used in the invention are closed-cell foams although open-cell foams and partially open-cell foams are contemplated as being operable in some implementations.

Foam blocks 32 can be made from a wide variety of compositions including, without limitation, extruded polystyrene foam, expanded bead polystyrene foam, rigid urethane foam, or polyisocyanurate foam. The foam can be a rigid foam or flexible, e.g. resiliently highly compressible, foam. The foam is moisture resistant, preferably moisture proof, and is physically compatible with, and is generally chemically inert with respect to, the compositions and structures of layers 34, 36, and 50 as well as with the compositions and structures of the legs and end panels of the studs.

An exemplary foam board or foam block 32 has, without limitation, optional inner and outer skins and an expanded foam core between the skins. The skins can be un-foamed extruded films made with e.g. limestone-filled, fiberglass-reinforced polyester polymer. Such skins can be about 0.01 inch (0.25 mm) thick and may optionally contain alumina tri-hydrate (ATH) or other fire retardant material as an alternative to the limestone filler. The foam core of block 32 can be a polyisocyanurate foam having a density of about 2 pounds per cubic foot.

The foam skins can be any thin material which provides a modest level of protection from mechanical shock or intrusion into the foam core. For example and without limitation, another material which can be used for the skins is polyethylene film. Another material is fiberglass veil attached to a layer of paper or other substrate which can give a degree of dimensional stability to the skin. Still another example is a thin layer of foam attached to a dimensionally relatively stable layer of paper or plastic. In still other embodiments, foam blocks 32 are devoid of surface skins.

Regarding fixating the respective structural layers in their designated positions, the foam fills all, or substantially all, of the spaces between the respective surfaces of layers 34, 36, and 50, and is in surface-to-surface contact with any respective fibrous layers as such layers are e.g. wrapped about the respective foam blocks or are added to the construct in the build-up of inner layer 34. As the liquid resin is caused to flow around the foam, and comes into direct contact with the foam, and as the resin subsequently cures, the resin bonds to the cellular foam or the foam skin layer such that, in the finished building panel, after the resin is cured, the respective FRP structural layers are adhered/bonded to the foam, whether directly or through foam skin layers. Such flow of resin may interpose the resin between the foam and respective portions of some of the fibrous layers.

A fiberglass wrapping layer on a foam block 32 can be a pre-woven, or stitched, or knitted layer of fiberglass which is wrapped about a desired number of the sides of the foam block as in FIG. 12, or the fiber structure can be wrapped entirely about the foam block so as to form e.g. a butt joint where the ends of a wrapping layer meet, as in FIG. 13, or the wrapping layer can form an overlapping joint.

The fiber wrapping layer, wrapped around a foam block 32 can represent an open pattern where some of the foam surface is visible through the fiber wrapping layer after the wrapping has been completed. In the alternative, the wrapping layer can represent a closed pattern where the fiber visually obscures substantially all of the underlying surface of the foam block. A typical flow medium layer represents an open fibrous arrangement.

Given the presence of the wrapping layer 190 around a given foam block, the wrapping layer defines a portion of intercostal reinforcing web 50 which extends between inner layer 34 and outer layer 36.

Hand/Manual Lay-up Process

A first exemplary process for making the main body of building panels of the invention is, for example and without limitation, a hand/manual lay-up process performed on a processing table as illustrated in FIG. 15.

In FIG. 15, a generally-horizontally disposed processing table 68 is supported from floor 70 by legs 72. Processing table 68 has a length "L" and a width perpendicular to the length, and a generally flat top surface along both the length and the width of the table. The length "L" of table 68 represents generally the length of a building panel, or building panel precursor, to be produced on table 68. In the alternative, the length of table 68 represents generally a multiple of the lengths of building panels to be produced on the processing table. The width of table 68 (not specifically illustrated) represents generally the height of a building panel when installed in an upright e.g. vertical orientation, or a building panel precursor, to be produced on the processing table. For example, in a process designed to produce two building panels which are each 24 feet long by 9 feet high from a single panel precursor, table 68 can be 50 feet long and 112 inches wide, thus to produce a panel precursor of generally like length and width, and including additional length and width for the panel precursor in order to provide for trimming the precursor to the specified panel lengths and widths. After curing of the resin in the panel precursor, the panel precursor is then trimmed to make two building panels 14, each 24 feet long and 108 inches high.

Still referring to FIG. 15, a supply table 74 is located above processing table 68 and is supported from processing table 68 or from floor 70 by legs 76 and/or extensions of legs 72. Supply table 74 extends across the entire width of processing table 68. As viewed in FIG. 15, supply table 74 is inclined downwardly toward the left end of processing table 68. A supply of rolls of dry fiberglass, suitable for making a single panel precursor on table 68 is shown on supply table 74. An end stop 78 prevents the rolls of fiberglass from rolling off the end of supply table 74. In the illustrated embodiment, the fiberglass material on each such roll is 112 inches wide by 50 feet long. Thus, each roll is pre-cut to length and width, and thereby supplied to assembly table 68 such that the material on each roll contains the fiberglass dimensions needed for a given single layer of the fiberglass to be provided for fabrication/assembly into a single building panel precursor, sized to the length and width of processing table 68. The length of the fiberglass material is, of course, relatively longer where the panel precursor is to represent more than one panel or relatively shorter where the panel precursor is to represent a single panel. The rolls are arranged on the supply table, starting at the left end of the table, in the order in which the respective fiberglass layers are to be applied on processing table 68 during the build-up of the building panel precursor.

A resin tray 80 extends across the entire width of processing table 68, below supply table 74, and is supported above processing table 68 by a carriage 82. Carriage 82 is supported from processing table 68 by wheels 84 on opposing sides of the processing table, which wheels run on, or in, tracks (not shown) which are located on opposing sides of the table, and which tracks run the length of the table. Accordingly, carriage 82, and thus resin tray 80, can be rolled on wheels 84, at will, back and forth along the tracks, along the entire length of table 68.

Considering the exemplary structure illustrated in FIG. 15, the first roll on the left end of supply table 74 is roll 36FR which is used to make surface veil 36F in the building panel precursor illustrated in FIG. 4. Similarly, the second roll 36GR is used to make 1 osy CSM layer 36G in the panel precursor. The third roll 36HR is used to make 55 osy layer 36H. The fourth roll 34JR is used to make 17 osy layer 34J. The fifth roll 34HR is used to make 55 osy layer 34H. The sixth roll 34GR is used to make 1 osy CSM layer 34G. The seventh roll 34FR is used to make surface veil 34F. All of the rolls on supply table 74 are dry fiber, namely not wetted with resin or adhesive.

Near the left end of processing table 68, supported from the floor by e.g. a wood pallet, is a supply of wrapped foam blocks, or block clusters 42. Blocks 42 or block clusters can optionally be supported on a lift platform which brings a given layer of wrapped foam blocks or block clusters to an elevation consistent with the elevation of the top of table 68, As illustrated, FIG. 15 shows a stack representing six block clusters, plus a seventh block cluster shown in dashed outline above the stack with a dashed arrow indicating direction of movement as a block cluster is being introduced into the panel assembly process on table 68.

Still referring to FIG. 15, the process of assembling a building panel precursor begins by applying any desired release agent to the top surface of processing table 68. With the release agent, if any, in place, the first layer to be placed on processing table 68 is the surface veil layer 36F. Workers on opposing sides of processing table 68, lift roll 36FR by its roll ends, place the end of the layer 36F sheet of fiberglass, whose 50 foot length is wound on roll 36FR, on the left end of processing table 68. Meantime, the next roll, namely roll 36GR, rolls by gravity to the left end of supply table 74 and against stop 78. The workers unroll roll 36FR of the surface veil onto, and along, the length and width of, processing table 68 such that surface veil 36F generally covers the length and width of processing table 68.

With the surface veil layer 36F in place on processing table 68, and with a first supply of reaction curable resin loaded into resin tray 80, resin is released from the resin tray, by opening a resin closure (not shown) at the bottom of tray 80, whereupon the resin begins cascading down, by gravity, at a desired rate onto surface veil 36F, as the workers move carriage 82, and thus resin tray 80, along the length of processing table 68, thereby dispensing a generally uniform quantity of resin onto the surface veil over the entire length and width of the surface veil layer on the processing table, whereupon the resin closure is closed, stopping the flow of resin. The resin is sufficiently fluid to flow, to disperse, laterally and longitudinally about the length and width of surface veil layer 36F to become uniformly dispersed in, and to fill, the openings/voids in the surface veil layer. Typical resin viscosity, as applied to a given fiberglass layer or construct, is about 900 centipoise to about 1100 centipoise.

With the first supply of resin thus in place on, and dispersed in, surface veil layer 36F, the workers lift the next roll, 36GR, of fiberglass off the supply table, and place the end of the layer 36G sheet of fiberglass, whose 50 foot length is wound on roll 36GR, at the left end of processing table 68, on top of the left end of layer 36F and the first supply of resin. Meantime, the next roll, namely roll 36HR, rolls by gravity to the left end of supply table 74 and against stop 78. The workers unroll roll 36GR of the 1 osy CSM onto, and along, the length and width of processing table 68 such that the 1 osy CSM layer 36G generally covers the length and width of processing table 68, the length and width of layer 36F, and the length and width of the first supply of resin.

With the 1 osy CSM layer in place on processing table 68, the resin closure is again opened, whereupon a second supply of resin is released from resin tray 80, cascading down, by gravity, at a desired rate onto the 1 osy CSM layer, as the workers move carriage 82, and thus resin tray 80, along the length of processing table 68, thereby dispensing a generally uniformly dispersed quantity of resin onto the 1 osy CSM layer 36G over the entire length and width of the CSM layer on the processing table, whereupon the resin closure is again closed. The resin is sufficiently fluid to flow, to disperse, laterally and longitudinally about the length and width of the surface of the 1 osy CSM layer to become uniformly dispersed in, and to fill, the openings/voids in the 1 osy CSM layer.

With the second supply of resin thus in place on, and dispersed in, the 1 osy CSM layer 36G, the workers lift the next roll, namely roll 36HR, of fiberglass off the supply table, place the end of the layer 36H sheet of fiberglass, whose 50 foot length is wound on roll 36HR, at the left end of processing table 68, generally on top of the end of layer 36G and the second supply of resin. Meantime, the next roll, roll 34JR, rolls by gravity to the left end of supply table 74 and against stop 78. The workers then unroll roll 36HR of the 55 osy woven roving along the length and width of processing table 68 such that the 55 osy woven roving layer 36H generally covers the length and width of processing table 68, layer 36G, and the second supply of resin.

With the 55 osy woven roving layer 36H in place on processing table 68, the resin closure is again opened, whereupon a third supply of resin is released from the resin tray, cascading down, by gravity, at a desired rate onto the 55 osy woven roving layer 36H, as the workers move carriage 82, and thus resin tray 80, along the length of processing table 68, thereby dispensing a generally uniform quantity of resin onto the 55 osy woven roving layer over the entire length and width of the woven roving layer on the processing table, whereupon the resin closure is again closed. The resin is sufficiently fluid to flow, to disperse, laterally and longitudinally about the length and width of the surface of the 55 osy woven roving layer to become uniformly dispersed in, and to fill, the openings/voids in the 55 osy woven roving layer.

With the third supply of resin thus in place on, and dispersed in, the 55 osy woven roving layer 36H, the workers begin to take block clusters from the stacks at e.g. the left end of processing table 68, optionally at the right end of processing table 68, optionally at both ends of the processing table, and place the clusters across the width of processing table 68. Each foam block 32 in a given block cluster is wrapped in a dry layer of e.g. 17 osy fiberglass. The leading edge of the first block cluster overlies the leading edge of 17 osy woven roving layer 36H at the right end of table 68 (FIG. 15). A leading edge of the second block cluster abuts the trailing edge of the first block cluster. The leading edge of each succeeding block cluster abuts the trailing edge of the next adjacent leading block cluster. If not already in place on the end of a given block cluster, a flow medium layer 192 is placed at the trailing end of each block cluster which ends up facing a leading end of a next adjacent, and trailing, block cluster. Such flow medium layer 192 can have been bonded to a leading end, or a trailing end, of the block cluster as the block cluster was in the process of earlier being fabricated. In the alternative, the flow medium layer can be placed on, optionally bonded to, the trailing end of the block cluster after the block cluster has been placed on the processing table. In an example, and without limitation, as placed on table 68, each block cluster has a width of approximately 50 inches extending along the length of table 68, and a length of 112 inches extending across the width of table 68. The loose ends of the block wrapping layers 190 may extend upwardly from the tops of the respective blocks, or downwardly from the bottoms of the respective blocks. The workers apply the block clusters, edge to edge, along the full length, and across the full width of processing table 68, whereby 12 such block clusters, each about 50 inches wide, are required to completely cover the width of table 68, and the length of table 68, when the table is designed for building a panel precursor about 50 feet long.

With the block clusters thus completely covering the processing table, on top of the 55 osy woven roving layer 36H, the resin closure is again opened, and a fourth supply of resin is released from the resin tray, cascading down, by gravity, at a desired rate onto the block clusters, as the workers move carriage 82, and thus resin tray 80, along the length of processing table 68, thereby dispensing a generally uniformly dispersed quantity of resin onto the layer of block clusters over the entire length and width of the layer of block clusters on the processing table. The resin is sufficiently fluid to flow, to disperse, laterally and longitudinally about the length and width of the surfaces of the block clusters, and to flow into the fiberglass layers 190, 192 between the sides of the foam blocks, thereby to become uniformly dispersed in wrapping layers 190 and in any flow media layers 192, including resin penetration of wrapping layers 190 by the resin on underlying 55 osy layer 36H, so as to finish displacing substantially all of the air in layers 190 and 192 about the full surface area of each wrapped foam block 32.

With the fourth supply of resin thus in place on, and dispersed in, the layer of block clusters 42, the workers lift the next roll, namely roll 34JR, of fiberglass off the supply table, place the end of the layer 34J sheet of fiberglass, whose 50 foot length is wound on roll 34JR, at the left end of processing table 68, generally on top of the left end of the layer of block clusters and any respective surface portion of the fourth supply of resin. Meantime, the next roll, roll 34HR, rolls by gravity to the left end of supply table 74 and against stop 78. The workers unroll roll 34JR of the 17 osy woven roving along the length and width of processing table 68 such that the 17 osy woven roving layer 34J generally covers the length and width of processing table 68 and the layer of block clusters.

With the 17 osy woven roving layer 34J in place on processing table 68, the resin closure is again opened, whereupon a fifth supply of resin is released from the resin tray, cascading down, by gravity, at a desired rate onto the 17 osy woven roving layer, as the workers move carriage 82, and thus resin tray 80, along the length of processing table 68, thereby dispensing a generally uniform quantity of resin onto the 17 osy woven roving layer over the entire length and width of the woven roving layer 34J on the processing table, whereupon the resin closure is again closed. The resin is sufficiently fluid to flow, to disperse, laterally and longitudinally about the length and width of the surface of the 17 osy woven roving layer to become uniformly dispersed in, and to fill, the openings/voids in the 17 osy woven roving layer.

With the fifth supply of resin thus in place on, and dispersed in, the 17 osy woven roving layer 34J, the workers lift the next roll, 34HR, of fiberglass off the supply table, place the end of the layer 34H sheet of fiberglass, whose 50 foot length is wound on roll 34HR, at the left end of processing table 68, generally on top of the end of layer 34J and the fifth supply of resin. Meantime, the next roll, 34GR, rolls by gravity to the left end of supply table 74 and against stop 78. The workers unroll roll 34HR of the 55 osy woven roving along the length and width of processing table 68 such that the 55 osy woven roving layer 34H generally covers the length and width of processing table 68 and layer 34J.

With the 55 osy woven roving layer 34H in place on processing table 68, the resin closure is again opened, whereupon a sixth supply of resin is released from the tray, cascading down, by gravity, at a desired rate onto the 55 osy woven roving layer 34H, as the workers move carriage 82, and thus resin tray 80, along the length of processing table 68, thereby dispensing a generally uniform quantity of resin onto the 55 osy woven roving layer 34H over the entire length and width of layer 34H on the processing table, whereupon the resin closure is again closed. The resin is sufficiently fluid to flow, to disperse, laterally and longitudinally about the length and width of the surface of the 55 osy woven roving layer to become uniformly dispersed in, and to fill, the openings/voids in the 55 osy woven roving layer.

With the sixth supply of resin thus in place on, and dispersed in, the 55 osy woven roving layer 34H, the workers lift the next roll, namely roll 34GR, of fiberglass off the supply table, place the end of the layer 34G sheet of fiberglass, whose 50 foot length is wound on roll 34GR, at the left end of processing table 68, generally on top of the end of layer 34H and the sixth supply of resin. Meantime, the next, and last, roll, namely roll 34FR, rolls by gravity to the left end of supply table 74 and against stop 78. The workers unroll roll 34GR of the 1 osy CSM along the length and width of processing table 68 such that the 1 osy CSM layer 34G generally covers the length and width of processing table 68 and layer 34H.

With the 1 osy CSM layer in place on processing table 68, the resin closure is again opened, whereupon a seventh supply of resin is released from the resin tray, cascading down, by gravity, at a desired rate onto the 1 osy CSM layer 34G, as the workers move carriage 82, and thus resin tray 80, along the length of processing table 68, thereby dispensing a generally uniform quantity of resin onto the 1 osy CSM layer over the entire length and width of the CSM layer 34G on the processing table, whereupon the resin closure is again closed. The resin is sufficiently fluid to flow, to disperse, laterally and longitudinally about the length and width of the surface of the 1 osy CSM layer to become uniformly dispersed in, and to fill, the openings/voids in the 1 osy CSM layer.

With the seventh supply of resin thus in place on, and dispersed in, the 1 osy CSM layer 34G, the workers lift the next/last roll, namely roll 34FR, of fiberglass off the supply table, place the end of the layer 34F sheet of surface veil fiberglass, whose 50 foot length is wound on roll 34FR, at the left end of processing table 68, generally on top of the end of layer 34G and the seventh supply of resin. The workers unroll roll 34FR of the surface veil along the length and width of processing table 68 such that the surface veil layer 34F generally covers the length and width of processing table 68 and layer 34G.

With the surface veil layer 34F in place on processing table 68, the resin closure is again opened, whereupon an eighth supply of resin is released from the resin tray, cascading down, by gravity, at a desired rate onto surface veil layer 34F, as the workers move carriage 82, and thus resin tray 80, along the length of processing table 68, thereby dispensing a generally uniform quantity of resin onto the surface veil layer over the entire length and width of the surface veil layer 34F on the processing table, whereupon the resin closure on resin tray 80 is again closed. The resin is sufficiently fluid to flow, to disperse, laterally and longitudinally about the length and width of the surface of the surface veil layer to become uniformly dispersed in, and to fill, any voids/openings, in the surface veil layer.

As desired, for dispersal of resin on any one then-top layer of fiberglass or block clusters, the quantity of resin placed/filled into resin tray 80 can be limited to that quantity of resin which is to be dispersed onto the given top layer, whereby resin can be filled into the resin tray before each instance of applying resin onto the then-existing panel precursor construct.

In the alternative, the resin tray can be filled with enough resin for multiple dispensings of resin onto multiple layers of fiberglass or block clusters, one layer at a time, whereupon the quantity of resin dispensed onto the top of the underlying panel under construction can be controlled by the time between opening the resin closure and closing the resin closure or by the extent to which the resin closure is opened, namely by the degree of opening of the resin closure, or other method of controlling the rate of flow of resin from the resin tray.

With the above panel construct in place on the processing table, elongate perimeter boards (not shown) are put in place about the perimeter of the construct, on both sides of the width of table 68 as well as on both ends of the table, thus to somewhat immobilize end portions and side portions of the respective layers of fiberglass on the table.

A stiff backup board (not shown) is then placed on the top surface of the panel precursor construct. The backup board generally overlies the entire length and the entire width of the panel precursor construct on the processing table as well as the entire length and width of the processing table, itself. The purpose of the backup board is to enable application of a generally uniform downward pressure on the panel precursor construct, pressing the construct downwardly against table 68, thus to even out any surface irregularities in the construct, thereby to provide a generally constant thickness, as well as a constant surface texture, to the resulting panel precursor construct.

With the backup board in place overlying the entire length and width of the construct, an e.g. vacuum oven or other heat source is moved into position over, and optionally under, the construct and the construct is heated for a time necessary to cure the resin. Such heating time for a general purpose polyester resin is typically at least 40 minutes. Heat is typically applied both over and under the construct, typically to a temperature, at the outer surface of the construct, of at least 200 degrees F. Curing of the resin/fixes the dimensions of the construct, whereby fabrication of the panel precursor is complete.

In the alternative, the panel precursor and back-up board can be moved into the e.g. vacuum oven or other heat source.

Once the panel precursor has absorbed sufficient heat to cure the resin, the oven or other heat source and panel precursor are separated from each other and the panel precursor is allowed to cool.

Perimeter boards are removed, and the panel precursor is trimmed to desired length or lengths, and width or widths, of the finished panel or panels. In the exemplary process, where the table is 50 feet long, the 112 inch wide precursor is trimmed on both sides to a finished width of 108 inches. One end is then trimmed square with the width of the precursor, and two 24-foot long panels are then cut from the original 50-foot length of the precursor.

In this example, the same resin composition is used for all applications of resin to the panel precursor construct. The resin can be a general purpose two-part polyester resin composition, including about 30 percent by weight filler. An exemplary resin is the above recited J941® unsaturated polyester resin as the first part and peroxide-based Cadox L50a as the second part.

As an alternative to the use of block clusters 42, individual foam blocks, each pre-wrapped with a dry wrapping layer 190, can be placed on the underlying construct, side by side. A flow medium insert can be applied at the left side (FIG. 15) of each wrapped foam block e.g. as the wrapped foam block is introduced onto the panel precursor construct; and resin, adhesive, or other bonding agent, sprayed onto, or otherwise applied to, the flow medium when the flow medium is applied to the block. In the alternative, the flow medium 192 can be pre-applied, and bonded, to the wrapped foam block before the wrapped foam block is placed on the underlying construct.

The amount of resin applied at each layer or each element of the construct, is that amount of resin which will thoroughly wet all of that respective layer/element, through the thickness of the layer, such that each layer or element is wetted with enough resin, and the resin has enough fluidity, to fill and replace all openings/voids, air spaces, and the like, in that layer. An additional, and surplus, increment of resin can be applied to layer 36H, which surplus increment is then available to migrate, e.g. by surface tension, and/or application of vacuum, into wrapping layers 190 when the foam blocks, or block clusters, are placed onto layer 36H.

While supply table 74 has been shown inclined downwardly for gravity feed of rolls to stop 78, table 74 can as well have a horizontal or other orientation, including upwardly inclined, and supplied with a mechanical pusher, powered by a stepper motor, a spring, or other means of controlled advance of the rolls, on supply table 74, to stop 78.

The above hand/manual lay-up process can be automated such that the respective rolls of dry fiberglass are placed on supply table 74, and are placed on processing table 68, and are unrolled along the length of table 68, by first suitably-designed machines. Similarly, the resin can be loaded into resin tray 80, and tray 80 moved along table 68 while dispensing the resin, by second suitably designed machines. In fact, the entire process of loading rolls of fiberglass onto a supply table or other supply station,
applying the rolls of fiberglass to the processing table,
unrolling the rolls of fiberglass on the processing table or on an underlying layer,
applying wrapped foam blocks or block clusters to the processing table,
applying resin to each layer, or the block clusters, after the respective layer or block clusters have been applied to the construct on the processing table,
applying the back-up board to the construct,
applying heat, and optionally applying vacuum, to the construct,
trimming the cured construct for length and width, and cutting individual panels from the cured construct, all as recited above for manual activation, can all be automated using suitably-designed industrial machines and processes.

Pultrusion Process

A second exemplary process for making the main body of building panels of the invention is, for example and without limitation, a pultrusion process starting at e.g. an assembly table 69.

Figure 16:
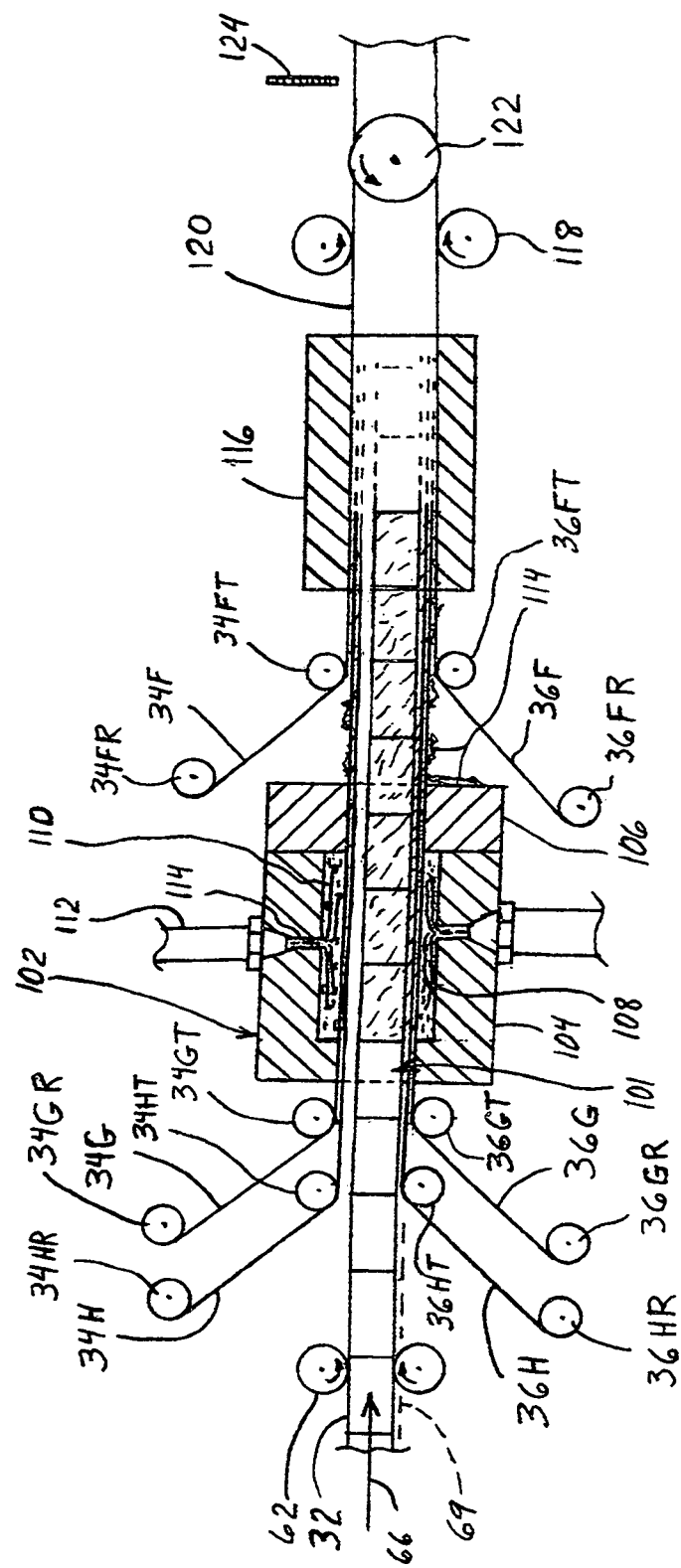
FIG. 16 is a side elevation representation of an exemplary pultrusion process for fabricating main body components of building panels of the invention.

As illustrated in FIG. 16, an ongoing steady, continuous supply of wrapped foam blocks 32, wrapped with dry fiberglass, is fed, left to right, as suggested by arrow 66, onto assembly table 69, which is shown only as a single dashed line at the left end of FIG. 16. Wrapped foam blocks 32 can be fed either as individual wrapped blocks, or as clusters 42 of wrapped blocks. Whether fed as individual wrapped foam blocks, or as block clusters, optional flow medium layer 192 (FIG. 15), where used, extends the full length and height of the given foam block, and is attached to the trailing side, namely to the left side, of each block being fed onto assembly table 69. Flow medium layer 192 can, in the alternative, be attached to the leading side of a foam block or block cluster, namely to the right side of the respective block or block cluster. The critical feature is that a flow medium layer is positioned/located between each next adjacent pair of foam blocks, whether the foam blocks are wrapped or are not wrapped.

Table 69 has a width which receives thereon the entire elongate lengths of the wrapped blocks, which block lengths correspond generally to the heights (e.g. 9 feet height) of building panel main bodies 14A being produced in the pultrusion process, including trim allowance of, for example and without limitation, about 2 inches on each end. Restated, the lengths of wrapped foam blocks 32 extend transverse, e.g. perpendicular, to the left-to-right direction of movement of the foam blocks into and through the pultrusion process.

In some embodiments, each foam block 42 is wrapped with a dry fiberglass layer 190 on all, e.g. four, sides of the respective foam block, as illustrated in FIG. 9. Namely, wrapping layer 190 completely covers that surface of the foam block on the side of the foam block which will face fiberglass layer 34, namely the side of the foam block which will face the interior of the building. Wrapping layer 190 can be mounted on the foam block such that the edges of the wrapping layer meet in edge to edge relationship as in FIG. 9.

In the alternative, the ends of wrapping layer 190 can overlap each other (not shown). In either case, layer 34J, which overlies space 37 in the embodiments illustrated in FIG. 4, can be omitted, whereby layer 34H is in facing, and direct, contact with wrapping layer 190, typically but not necessarily on the side of a respective foam block which receives the ends/edges of wrapping layer 190.

Further to the process of constructing block cluster 42 as illustrated in FIG. 9, resin or adhesive is applied to one or both sides of a given foam block before the respective foam block is placed in facing side-by-side relationship with a next adjacent foam block. In an illustrative embodiment, a first wrapped foam block is placed, dry, on one of its side surfaces 32SF in an upright jig/block holder which is capable of receiving and holding a single-wide stack of wrapped foam blocks, stacked sequentially on top of each other. The opposing facing surfaces 32SF of each next adjacent one of the wrapped foam blocks in the jig, face upwardly and downwardly. As an option, the opposing upwardly facing surface of the wrapped foam block can be dry, or can be painted or sprayed with resin or adhesive, even in the jig, or can have been dipped in a resin/adhesive bath, all whereby upwardly-facing surface 32SF of the wrapped foam block can be wet with resin as the wrapped foam block is resident in the upright jig. Or the upwardly-facing surface can be dry.

A second wrapped foam block is placed in the jig/block holder with a downwardly-facing surface 32SF in contact with the upwardly facing surface 32SF on the first wrapped foam block. With the downwardly-facing surface 32SF of the second wrapped foam block in contact with the upwardly facing surface 32 FS of the first wrapped foam block, at least one of the facing surfaces 32SF has been/is wetted with resin/adhesive so as to adhesively bond the first and second wrapped foam blocks to each other at their respective facing, and wrapped, surfaces 32FS. Third and additional wrapped foam blocks are then sequentially stacked on top of each other in the jig/holder, wherein at least one of the facing side surfaces 32SF, of each pair of facing/contacting surfaces has been wetted with resin/adhesive before coming into contact with the next adjacent wrapped foam block.

A desired number of wrapped foam blocks are thus stacked on top of each other, each having a downwardly-facing side surface 32SF and an upwardly-facing side surface 32SF, to create a stack representing, in height, a desired width of a foam block cluster 42 as illustrated in FIG. 19. Such width of wrapped foam block cluster extends along the length dimension of a panel precursor being formed, as in FIGS. 15 and 16, namely along the length "L" in FIG. 15 or the direction of advance of the materials in FIG. 16.

Once the desired number of wrapped foam blocks has been stacked in the jig/holder, the stack is held, typically upright, in the jig/holder while applying modest downward pressure on the stack, so as to urge the next adjacent sides of the respective wrapped foam blocks into engaging relationship with each other. The stack is so held lightly compressed while the resin/adhesive, at the side facing surfaces 32SF, cures. Curing of the resin can be accelerated, as desired, by applying heat to the stack.

Block clusters 42 so assembled with resin/adhesive, and cured, in the jig/holder have sufficient bond strength at sides/surfaces 32SF that no mechanical fastening of the blocks to each other, as in FIGS. 6-8, is needed. Further, no flow medium 192 is needed. Rather, the block cluster, comprising the stack of wrapped foam blocks, bearing the cured resin in wrapping layer 190 at side surfaces; 32SF, is securely held together without use of flow medium 192.

Returning now to FIG. 16, push rolls 62 are mounted in compressing opposition to each other, above and below the elevation of the top of assembly table 69, close enough together to compress wrapped foam blocks 32 as the foam blocks pass along table 69. In the alternative, upper and lower push belts (not shown in FIG. 16) in compressing opposition to each other, can be used instead of push rolls 62. Push rolls 62 counter-rotate relative to each other, at such speed, and exerting enough compression on wrapped foam blocks 32, to continuously feed a steady supply of such foam blocks or block clusters, each foam block or block cluster following, and abutting, the next adjacent foam block or block cluster, the blocks moving left-to-right as illustrated in FIG. 16, at a desired speed consistent with the overall speed of advance of materials into and through the pultrusion process. As the wrapped foam blocks move left to right along table 69, a plurality of layers of fiberglass, each extending the full width of table 69, are brought, e.g. pulled, into interfacing contact with the upper and lower surfaces of the wrapped foam blocks.

Still referring to FIG. 16, and considering the structure of main body 14A as described and illustrated with respect to FIGS. 9 and 17, wherein layer 34J has been omitted, a first feed roll 34HR, above assembly table 69, provides a dry layer/fabric of 69 osy fiberglass 34H, which is pulled into the process by pulling rolls 118, and which turns around turning roll 34HT, bringing fiberglass layer 34H into facing contact with the upper surface of the supply of wrapped foam blocks moving along table 69.

A second feed roll 34GR, above assembly table 69, provides a dry layer/fabric of 1 osy CSM fiberglass 34G, which is pulled into the process by pulling rolls 118 and which turns around turning roll 34GT, bringing fiberglass layer 34G into facing contact with the upper surface of fiberglass layer 34H.

A third feed roll 36HR, below assembly table 69, provides a dry layer/fabric of 69 osy knitted fiberglass fabric 36H, which is pulled into the process by pulling rolls 118, and which turns around turning roll 36HT, bringing fiberglass layer 36H into facing contact with the lower surface of the supply of wrapped foam blocks moving along table 69.

A fourth feed roll 36GR, below assembly table 69, provides a dry layer/fabric of 1 osy CSM fiberglass 36G, which is pulled into the process by pulling rolls 118, and which turns around turning roll 36GT, bringing fiberglass layer 36G into facing contact with the lower surface of fiberglass layer 36H.

The resulting dry construct 101 of wrapped foam blocks 32, and dry layers 34H, 34G, 36H, and 36G of fiberglass has a length extending left to right, a top to bottom height, and a width extending the lengths of the wrapped foam blocks to opposing edges of the construct. Construct 101 passes from assembly table 69 into resin applicator 102. Applicator 102 includes an applicator body 104 and an applicator cap 106 which, together, define a resin application cavity 108 where resin is applied to the incoming construct of foam blocks and layers of dry fiberglass. Application cavity 108 is sized and configured to completely surround the width and height of dry construct 101 along the length of the cavity. Liquid resin 110 is supplied to resin applicator 102 through a plurality resin supply pipes 112 on the top and on the bottom of applicator 102, the supply pipes being spaced across the width of applicator 102, spaced sufficiently close to each other to provide a uniform flow of resin across that portion of the length and the width of the construct which is in the resin application cavity. Each supply pipe 112 feeds liquid resin into one or more receiving conduits 114 in resin applicator 102, at a modest positive gauge pressure. The resin pressure, in combination with the spacing of receiving conduits 114, as supplied to the resin application cavity, is sufficient to cause the resin to disperse uniformly across the width of construct 101, and to impregnate the respective layers of the construct, including layers 190, and 192 if layer 192 is used. The modest resin pressure also causes the resin to disperse about the height of the construct at the edges of the construct. Conventional pressure release passages, and optional vacuum draw passages, both not shown, enable the displaced air to escape from resin applicator 102.

As the construct departs the resin applicator, now fully wetted, through and through, with resin, an excess of resin 114 weeps from the lower surface of the wetted construct, and lies in what can be called puddles of resin on the top surface of the wetted construct.

The so wetted construct travels from the resin applicator to a curing heat source such as a curing oven 116. Between resin applicator 102 and the curing heat source, supply rolls 34FR and 36FR supply first and second fabrics/layers 34F and 36F of surface veil fiberglass to the upper and lower surfaces of the wetted construct, which layers 34F and 36F are pulled into the process by pulling rolls 118, and which layers 34F and 36F are turned about turning rolls 34FT and 36FT.

The wetted construct, now covered, top and bottom, with surface veil layers 34F and 36F, and with the surface veil layers wetted with the excess resin, is pulled past or through the curing heat source where the resin in the construct is cured, hardened to a solid state. The entire construct, including the cured, hardened construct, as well as the materials being fed/pulled into the construct, is pulled along the pultrusion path, including being pulled past or through the curing heat source, and thus pulled the full length of the construct, including pulling fiber from fiber supply rolls 34HR, 34GR, 36HR, 36GR, 36FR, and 34FR, by upper and lower pulling rolls 118.

The resulting cured construct 120 is produced in continuous length, and in a width which is modestly wider than the height of the panels desiredly being produced in the process. In the exemplary construct 120, intercostals/ribs 50, which are defined by layers 190, and optionally 192, extend across the width of the construct, namely transverse, typically perpendicular, to the direction of travel of the construct left to right through the process. Accordingly, where the width of the cured construct 120 is about 112 inches, the cured construct is trimmed for width, to the desired width of e.g. 108 inches, by edge saws 122 after the cured construct leaves curing heat source 116. The so-trimmed construct is then cut for length, e.g. 24 foot length, or any other desired length, across the full width of the trimmed construct, by cut-off saw 124. Since the process produces a continuous length of the cured construct, the only limitation on maximum length of the main body as cut by saw 124 is the availability of transport of building panels 14, or main bodies 14A, of the selected length. Since such transport is typically by flatbed truck, any governing limitations on truck length typically control the maximum available panel length or main body length. Shorter length can, of course, be cut for panels, as desired, for a particular application, for a given panel installation project.

The cured construct as produced in FIG. 165 is the main body 14A of building panels 14. Studs 23 can then be applied according to the processes described with respect to e.g. FIGS. 12 and 13.

In a set of alternative embodiments, the foam blocks need not be wrapped by wrapping layers 190. In such embodiments, a resin-impregnated fibrous layer 192 is disposed between each pair of foam blocks thereby to provide intercostals 50, a given fibrous layer 192 being positioned against a given foam block, and extending in a "y" direction between the top and the bottom of the respective foam block, and in a "z" direction along the length of the respective adjacent foam block, namely across the width of the building panel precursor being fabricated, both the "y" and "z" directions extending transverse to the pultrusion direction.

When a building panel of the invention is being used as a load bearing wall in a building construct, the outer layer 36 of the building panel is stressed by side loading e.g. back-fill soil, and/or by water pressure, or is periodically side-loaded by wind loading if the panel is used above ground. Such side loading at the outer layer of the panel results in the inner layer 34 of the building panel being stressed in tension. The reinforcing intercostal web portions 50, the stud end walls 126 and legs 128 correspondingly experience shear stress as a result of such side loading. Given the uncertainties regarding loads which will be applied to a given building panel, e.g. by soil side loading, wind side loading, weight of the overlying building structure, and the like, and the changing dynamics of loadings of panels in a given building, layers 34 and 36 of the building panel are typically developed at a common thickness of the fiber reinforced polymeric material of about 0.08 inch to about 0.30 inch. Intercostal layers 50 can be the same thickness as building panel layers 34, 36, or thicker, but are optionally about 0.09 inch to about 0.25 inch thick, and are typically thinner than panel layers 34 and 36.

An additional e.g. FRP reinforcing layer, not shown, can be used selectively e.g. in locations on a wall where additional peak loads are expected to be applied to the wall and wherein remainder portions of the wall have adequate strength to accommodate and support the loads expected to be applied at such remainder portions and so do not include the reinforcing layer. Such selective, and limited, use of reinforcing layers adds to cost-efficiency of the wall by allowing a substantial portion of the length of the wall to be specified for less capacity than is needed at the peak load locations, and using reinforcing layers to strengthen the wall at such peak load locations.

Such additional e.g. reinforcing layer can be used in association with the outer layer of the wall to strengthen the wall at the outer layer, or can be used in association with the inner layer to strengthen the wall at the inner layer, or first and second reinforcing layers can be used at both the outer layer and the inner layer. A such reinforcing layer, whether at the inner layer or at the outer layer, or both, can be continuous along the length of the wall, or can be discontinuous, used e.g. only where peak loads are expected to be experienced by the wall.

Such reinforcing layer can apply to the full length and height of a given building panel 14 or can apply to only a selected section of the building panel. For example, and without limitation, a roll of the reinforcing layer material can be added to supply table 74, or fed into dry construct 101, in the order in which such reinforcing layer is to be applied to the construct. Namely, such reinforcing FRP layer can be a surface layer, or can be between two of the above-recited layers. At the appropriate time during the building of the panel precursor, the reinforcing layer roll of material is applied to processing table 68 along with a follow-up supply of resin, or to assembly table 69.

As elements of the panel, and when addressing the fiber content of respective layers, the fiber is sometimes referred to herein as fiberglass "layers" and is described in terms of the FRP layers into which such fiberglass layers will be incorporated in the resin-saturated finished product. Those skilled in the art understand that the fiber layers are exactly that, fibrous layers, and that designating such fibrous layers in terms of the layers of the finished panel is done for sake of simplicity of the description. Those skilled in the art will recognize that the resin has not been added to the panel precursor unless so stated, whereby the layer designations apply to the fiber alone, and that such fiber ultimately becomes part of the respective FRP layer 34 or 36 of the main body (being fabricated) when resin is added to the fibrous layer.

An exemplary building panel 14, for use in a foundation in single-family residential construction, is 9 feet (2.7 meters) high and has lateral deflection at rated vertical and horizontal loads of no more than about 0.9 inch anywhere on the panel.

Main body 14A of Such exemplary building panel, has a nominal thickness "T" of about 3.75 inches. Studs 23 are about 1.5 inches wide and project inwardly about 3.5 inches from outermost surface 25 of inner layer 34 of the main body. Inner layer 34 is about 0.08 inch to about 0.30 inch thick. Outer layer 36 is about 0.08 to about 0.30 inch thick. Intercostals 50 are about 0.08 inch to about 0.30 inch thick. Studs 23 have a first end wall 126 and first and second legs 128, each about 0.08 inch thick to about 0.30 inch thick, and a second end wall which, if specifically prepared as recited herein for adhesion to surface 25 (FIG. 10 description), is about 0.03 inch to about 0.07 inch thinner than the other walls of the stud, e.g. about 0.05 inch to about 0.23 inch thick. The foam in foam blocks 32 is typically, but not necessarily, polyisocyanurate foam having density of about 2 pcf. Such building panel has a mass of about 55 pounds per linear foot, a vertical crush-to-catastrophic-failure capacity of at least about 15000 pounds per linear foot, taken along the length of the panel and a horizontal bending resistance, when loaded at a designed load in accord with ASTM E72, of at least L/120, optionally at least L/180, optionally at least L/240, where "L" is the straight line dimension of the panel, top to bottom, when the panel is installed in an upright orientation.

Depending on the safety factors desirably built into the building panels, and given a known typical load capacity of at least 15000 pounds per linear foot in the above-illustrated example, the absolute vertical crush-to-catastrophic-failure capacity can be engineered to be as little as about 4000 pounds per linear foot, thus to limit panel cost, optionally at least about 6000 pounds per linear foot, typically at least about 8000 pounds per linear foot. At least 10,000 pounds per linear foot can be specified, as can at least 12,000 pounds per linear foot, namely any capacity up to the maximum known capacity with the above-recited layer thicknesses, of up to about 25,000 pounds per linear foot. Panels of the invention, 9 feet high, have been tested/loaded according to ASTM E72 to catastrophic failure at axial, e.g. top-to-bottom loads of over 80,000 pounds per foot length of the panel. Correspondingly, using a safety factor of 3×, such panels can tolerate over 25,000 pounds per foot axial load in a building, which 25,000 pounds typically exceeds both the load-bearing capacity of the underlying natural base and the load typically imposed by an overlying e.g. low-density residential building.

Whatever the materials used as the reinforcing fiber, the foam, and the resin, including e.g. resin fillers, all of such elements, including UV inhibitors and fire retardant additives, are chemically and physically compatible with all other elements with which they will be in contact, such that no deleterious chemical or physical reaction takes place in wall systems of the invention.

Building panels and walls of the invention are essentially water proof; and such water proof characteristic is not generally deleteriously affected by hurricane-driven rain. Outer layer 36 of building panel 14 is, itself, very water resistant. While layer 36 is quite difficult for water to penetrate, even if layer 36 is breached, foam blocks 32 are very water resistant in that the individual cells of the foam in blocks 32 are typically closed cells. If the foam layer is also breached, inner layer 34 of building panel 14 is also very water resistant. In any event, any breaching force of water has to penetrate multiple very water resistant layers.

Further Considerations for Blocks and Block Clusters

As illustrated in FIG. 12, a 17 osy layer 34J of fiberglass is used directly against the wrapped foam block and wherein a space 37 is disposed between the ends 194 of the e.g. 17 osy wrapping layer 190. Thus, layer 34J provides a strength property, similar to the strength property of the 17 osy layer 190, where layer 190 is absent against the foam block, namely between the ends 194 of the wrapping layer.

Figure 18:
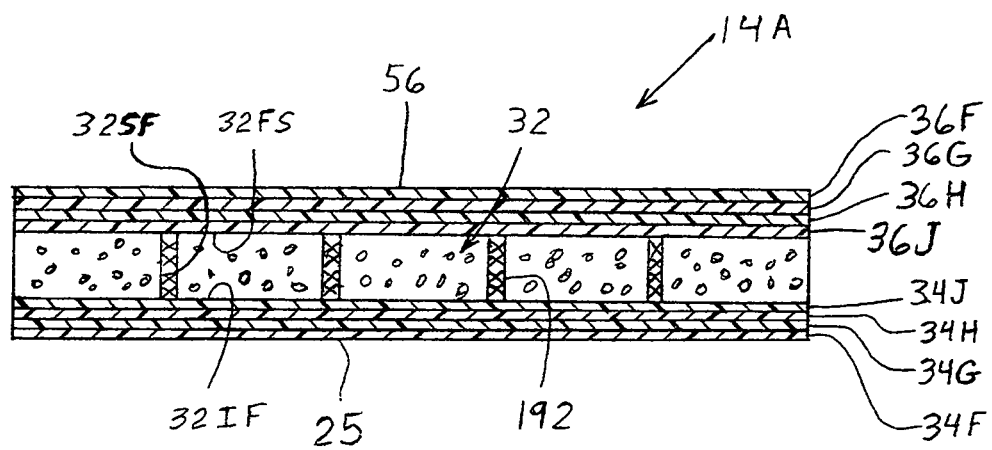
FIG. 18 is a cross-section of a portion of a third embodiment of the main body of a building panel of the invention as in FIGS. 4 and 17 wherein a fibrous flow medium, wetted with resin/adhesive is applied along the length of the facing sides of each pair of next adjacent foam blocks as part of the process of fabricating the foam block cluster, whereby no wrapping layer need be employed around the foam blocks.

In some embodiments, some or all of foam blocks 32 are not wrapped and are incorporated into main body 14A as unwrapped foam blocks, or foam block clusters 42 where some or all of the individual foam blocks are not wrapped with a wrapping layer 190. Where unwrapped foam blocks 32 are incorporated into the building construct of main body 14A, a fibrous flow medium 192, wetted with resin/adhesive, is applied along the length of the facing side surfaces 32SF of the next adjacent ones of the respective pairs of foam blocks, as part of the process of fabricating the foam block cluster, or as part of incorporating a given foam block, into a main body construct being fabricated. Such use of flow medium 192, without any wrapping layers 190, is illustrated in the main body cross-section illustrated in FIG. 18. Also as seen in FIG. 18, a 17 osy layer 34J or the like is used on one side of, and in contact with, the unwrapped foam block. An additional 17 osy layer 36J is used on the opposing side of, and in contact with, the unwrapped foam block, whereby both layers 34J and 36J are used on opposing sides of, and in contact with, the unwrapped foam block, thereby providing approximately the same 17 osy mass of fiberglass in the main body, on both sides of the foam blocks, as is provided when the foam blocks are provided as wrapped foam blocks. Accordingly, layers 34J and 36J serve as substitutes, stand-ins, replacements, for the strength provided by the wrapping layer, when unwrapped foam blocks are used in main body 14A.

In some embodiments, flow medium 192 is provided, assembled into, the block cluster dry, namely with no resin/adhesive applied to the flow medium before the flow medium is incorporated into the block cluster. In such instance, and irrespective of whether the foam blocks are wrapped, or not wrapped, a mechanical keeper 46, illustrated in FIGS. 6-8, is used to hold the block cluster together as a unitary element of the main body inputs into the process of assembling the main body precursor.

In some embodiments, flow medium 192 is provided, assembled into, the block cluster in a pre-wetted condition, or is wetted, namely already wetted with resin/adhesive, as part of the process of incorporating the flow medium into a block cluster assembly process. In such instance, where the blocks are wrapped with wrapping layers 190, the block cluster is temporarily held together, whether by a mechanical keeper or by a cluster jig/holder relying on gravity, or other force, until the resin/adhesive cures, whereupon any mechanism or other force being used to hold the block cluster together can be removed, whereafter no further forcing/holding of the blocks to each other is needed, and any mechanical keeper or gravity or other retainer can be removed.

Where the blocks are not wrapped with wrapping layers 190, adhesion between the foam and the flow medium may not be sufficiently strong that a mechanical keeper or the like can be released after the resin/adhesive is cured. Accordingly, release of the mechanical keeper is determined on a case-by case basis.

In some embodiments, the wrapped foam blocks are wetted with resin/adhesive as/before the blocks are brought into facing contact with each other adjacent side surfaces 32SF. In such instance, since the wrapping layers are already saturated with cured resin/adhesive adjacent surfaces 32SF, there is no need for additional resin/adhesive between the surfaces 32SF as the main body is assembled. Accordingly, in such instance, flow medium 192 can be omitted as illustrated in FIG. 17.

Where the blocks are wrapped, leaving a space 37 between ends of the wrapping layer, 17-18 osy layer 34J or the like is used to cover such space 37. Where the block is fully wrapped as in FIGS. 9 and 17, layer 34J can be omitted.

Restated generally, a 15-20 osy layer 34J and/or 36J is used directly against the surface of the foam block at any portion of the surface of the foam block which faces either inner surface 25 or outer surface 56, and which is not covered by a wrapping layer 190.

More Fiber Layer Considerations

In a hand/manual lay-up process, as illustrated in FIG. 15, where a limited degree of tension, if any, is experienced by the main body precursor elements during assembly of the main body, the various fiber layers can be woven roving, knitted fabric, surface veils, chopped strand matt, or other fiber arrangement in a given fibrous layer.

By contrast, in a pultrusion process as illustrated in FIG. 16, the various layer elements of the main body are advanced through the processing machinery by pulling rolls 118 pulling on the finished/cured product assembly, which applies significant tensions on the layer materials being fed into and through the pultrusion process. Such tension will activate any elongation characteristics of the fiber layer inputs. Therefore, in order to control, and maintain consistency in, the mass of the fiber being incorporated into the pultruded product, for a given length-width area of pultruded product, stretch elongation of the fiber layers is limited, namely strictly controlled in order to ensure consistency, and thereby predictable functionality, of the resulting product.

Fiberglass woven rovings have substantial elongation properties. Knitted fiberglass fabrics have much lower magnitudes of elongation properties. Accordingly, knitted fiberglass fabrics are used in all layers to which substantial tension is applied, such as the pulling which necessarily accompanies a pultrusion process. Accordingly, in a pultrusion process, layers 34F, 34G, 34H, 36F, 36G, 36H, and 34J and 36J where used, are all knitted fiberglass fabrics. Wrapping layer 190 and flow medium layer 192 are not subjected to the pulling tension of pull rolls 118, and so both layers 190 and 192 can be any style/build of fiberglass fabric, including knitted fabrics or woven rovings.

Throughout this teaching, layers 34 and 36 have been referred to, respectively, as the inner and outer layers of the main body. At the same time, the various dry fibrous/fiberglass webs have been referred to as layers, namely layers 34F, 34G, 34H, 34J, 36F, 36G, 36H, 36J. All such dry fibrous layers are intended to be understood to be sub-layers which are incorporated into the precursor structure, and which become part of the resulting and respective inner and outer layers 34 and 36 of the panel main body once resin has been added to the overall precursor structure, and cured. Restated, layers 34 and 36 of main body 14A of building panel 14 are defined as the additive result of the respective fibrous sub-layers (34F, 34G, 34H, 34J, 36F, 36G, 36H, 36J) in combination with the resin which has been added into the structure, e.g. to the respective fibrous sub-layers.

The weight of any given one of the sub-layers can be selected once the end use of the building panel has been determined. Thus, a wide variety of surface veils can be selected for use depending on the texture desired at the first and second outermost surfaces 25, 56. Accordingly, surface veil can range from about 0.25 osy to about 1.25 osy.

The number and weights of the respective sub-layers used in inner and outer layers 34, 36 of the main body can vary from the number and weights illustrated in the respective recited embodiments. Thus, a greater number, or a lesser number, of sub-layers than those illustrated can be used. Similarly, the weight of a given layer can be greater, or less, than the weights described for the sub-layers in the illustrated embodiments. Namely, a layer described as 17 osy or 18 osy can be greater than, or less than, 17 osy or 18 osy. Similarly, a layer described as 55 osy or 69 osy can be greater than, or less than, 55 osy of 69 osy. Also, the weight recited for a given layer can be replaced by two or more layers which add up to the same, or a similar, overall weight. Or the weight illustrated for two or more layers, such as the 17 osy layer and the 55 osy layer, can be incorporated into a single layer of the same or similar weight, so long as the resulting single layer performs all of the functions required of the respective multiple layers.

Overall, where panel 14 is to be used for supporting the load of an overlying building structure, the inventors anticipate that inner layer 34 and outer layer 36, when carrying the maximum fraction of e.g. about 40 percent by weight fiber, will each contain at least about 30 osy of fiber. For a typical building panel which will support a conventional US residential structure, layers 34 and 36 each typically contain about 60 osy to about 120 osy fiberglass or other fiber, optionally about 70 osy to about 100 osy fiber.

Those skilled in the art will now see that certain modifications can be made to the apparatus, products, and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A fiber-reinforced polymeric structural building panel having a length, a top and a bottom, and comprising:
   (a) as a first component of said building panel, a main body, fabricated in a first fabrication process and comprising
      (i) an outer fiber-reinforced polymeric layer, said outer fiber-reinforced polymeric layer comprising a first set of fibers in a first reaction-cured resin composition, said outer fiber-reinforced polymeric layer defining a first outermost surface of said main body;
      (ii) an inner fiber-reinforced polymeric layer, said inner fiber-reinforced polymeric layer comprising a second set of fibers in a second reaction-cured resin composition, said inner fiber-reinforced polymeric layer defining a second outermost surface of said main body, opposite the first outermost surface of said main body; and
   (b) as a second component of said building panel, fabricated by use of a second fabrication process, different from the first fabrication process, a plurality of load-bearing studs, spaced along the length of said main body and extending, from said inner fiber-reinforced polymeric layer of said main body, away from the second outermost surface, including away from said main body, said studs extending along the height of said building panel between the top and the bottom of said building panel, each said stud comprising first and second end walls (126), and first and second stud legs (128), said end walls and said stud legs collectively defining outer surfaces of the respective said stud, said end walls and said stud legs, of a given said stud, comprising a third set of fibers in a third reaction-cured resin composition,
said first end wall having a first thickness at a first midpoint along a first width of said first end wall substantially equal to a second thickness of said first stud end wall at a first end of the first width of said first end wall, at least one of said second end wall and said first and second legs having a second width, a third thickness of the respective end wall or leg, at a second end of the second width, being greater than a fourth thickness of the respective second end wall or leg at a second mid-point along the second width of the second end wall or leg.

2. The fiber-reinforced polymeric structural building panel as in claim 1, said first end wall reflecting having had a first outer surface, prior to assembly to said main body, substantially rougher than a second outer surface of at least one of said second end wall and said first and second legs.

3. The fiber-reinforced polymeric structural building panel as in claim 2, at least one remaining one of said second end wall and said first and second legs, taken individually, having a maximum thickness across a width thereof at least 10 percent greater than the thickness of said first stud end wall at the first end of the first width of said first end wall.

4. The fiber-reinforced polymeric structural building panel as in claim 1, said studs being secured to said main body by at least adhesive.

5. The fiber-reinforced polymeric structural building panel as in claim 1, said studs being secured to said main body by at least mechanical fasteners.

6. The fiber-reinforced polymeric structural building panel as in claim 5 wherein said first end wall of a respective said stud is disposed toward said inner fiber-reinforced polymeric layer of said main body, and wherein first and second said mechanical fasteners extend through said first end wall into said main body, and axial extensions of said first and second mechanical fasteners extend through opposing ends of the respective said stud.

7. The fiber-reinforced polymeric structural building panel as in claim 6, said second end wall being disposed opposite said first end wall, further comprising an access port in said second end wall, spaced from the opposing open ends of said stud, a third mechanical fastener being disposed inwardly of said access port, toward said first end wall, with a shank of said mechanical fastener extending through first end wall and into said main body, and a head of said mechanical fastener being between said access port and said first end wall.

8. The fiber-reinforced polymeric structural building panel as in claim 1, said studs being secured to said main body by a combination of adhesive and mechanical fasteners.

9. The fiber-reinforced polymeric structural building panel as in claim 8, said building panel further comprising a plurality of foam block clusters disposed between said inner layer and said outer layer, at least one said foam block cluster reflecting having been fabricated separate from fabrication of said main body, each said foam block cluster comprising a plurality of foam blocks, each said foam block, in a given said foam block cluster, having a top, a bottom, a left side, and a right side, said building panel, when installed in an upright orientation, having a length and a height, and a thickness defined between said inner layer and said outer layer, a given said foam block, in a respective said foam block cluster, having a length extending along the height of said building panel, a width extending along the length of said building panel, and a thickness extending along the thickness of said building panel, a given said foam block cluster further comprising a mechanical keeper.

10. The fiber-reinforced polymeric structural building panel as in claim 9, said foam blocks in said foam block cluster being secured to each other independent of any securement to each other by virtue of being disposed between said inner layer and said outer layer in said building panel.

11. The fiber-reinforced polymeric structural building panel as in claim 10, said studs being affixed to said second outermost surface of said inner fiber-reinforced polymeric layer.

12. The fiber-reinforced polymeric structural building panel as in claim 9, said foam blocks, in a given block cluster, reflecting having been secured to each other by at least one of (i) adhesive, or (ii) one or more mechanical keepers, or (iii) a combination of adhesive and one or more mechanical keepers, prior to said foam block cluster having been interposed between said inner layer and said outer layer in said building panel.

13. The fiber-reinforced polymeric structural building panel as in claim 9, a fibrous wrapping layer extending over the left and right sides, and at least one of the top and the bottom of each said foam block, and extending along full lengths of respective next adjacent ones of said foam blocks, and extending from locations at least proximate said inner layer to locations proximate said outer layer, said fibrous wrapping layer on next adjacent ones of said foam blocks being spaced from each other by a flow medium layer.

14. The fiber-reinforced polymeric structural building panel as in claim 13, a resin flow medium (192) being disposed between respective opposing pairs of next adjacent ones of said foam blocks, and wherein said foam blocks are held to each other, in the block cluster, by one or more mechanical keepers.

15. The fiber-reinforced polymeric structural building panel as in claim 14, a respective said resin flow medium (192) being spaced from the respective said opposing pairs of foam blocks.

16. The fiber-reinforced polymeric structural building panel as in claim 1, said building panel having a vertical, top-to-bottom crush resistance capacity of at least 4000 pounds per linear foot length of said building panel, using a safety factor of 3.

17. The fiber-reinforced polymeric structural building panel as in claim 1 wherein said building panel, under a top-to-bottom load distributed between said outer layer and said second end walls of said studs, remote from said main body, deflects toward said outer layer.

18. The fiber-reinforced polymeric structural building panel as in claim 1 wherein said building panel has a vertical crush resistance capacity, to catastrophic panel failure, of at least 20,000 pounds per linear foot length of said building panel.

19. The fiber-reinforced polymeric structural building panel as in claim 1 wherein at least 50 percent by weight, of at least one of said first, second, and third sets of fibers in said main body, collectively, extends in a direction within 15 degrees of the top-to-bottom height of said building panel.

20. The fiber-reinforced polymeric structural building panel as in claim 1 wherein at least 50 percent by weight of each of said first, second, and third sets of fibers in said main body extends in a direction which is substantially aligned with the top-to-bottom height of said building panel.

21. An upright outer wall in a building comprising one or more fiber-reinforced polymeric structural building panels as in claim 1.

22. The fiber-reinforced polymeric structural building panel as in claim 1, said building panel further comprising a plurality of foam block clusters disposed between said inner layer and said outer layer, at least one said foam block cluster reflecting having been fabricated separate from fabrication of said main body, each said foam block cluster comprising a plurality of foam blocks, each said foam block, in a given said foam block cluster, having a top, a bottom, a left side, and a right side, said building panel, when installed in an upright orientation, having a length and a height, and a thickness defined between said inner layer and said outer layer, a given said foam block, in a respective said foam block cluster, having a length extending along the height of said building panel, a width extending along the length of said building panel, and a thickness extending along the thickness of said building panel, a given said foam block cluster further comprising a mechanical keeper.

23. The fiber-reinforced polymeric structural building panel as in claim 22, said foam blocks in said foam block cluster being secured to each other independent of any securement to each other by virtue of being disposed between said inner layer and said outer layer in said building panel.

24. The fiber-reinforced polymeric structural building panel as in claim 22, said foam blocks, in a given block cluster, reflecting having been secured to each other by at least one of (i) adhesive, or (ii) one or more mechanical keepers, or (iii) a combination of adhesive and one or more mechanical keepers, prior to said foam block cluster having been interposed between said inner layer and said outer layer in said building panel.

25. The fiber-reinforced polymeric structural building panel as in claim 22, a fibrous wrapping layer extending over the left and right sides, and at least one of the top and the bottom of each said foam block, and extending along full lengths of respective next adjacent ones of said foam blocks, and extending from locations at least proximate said inner layer to locations proximate said outer layer, said fibrous wrapping layer on next adjacent ones of said foam blocks being spaced from each other by a flow medium layer.

26. The fiber-reinforced polymeric structural building panel as in claim 22, a given said foam block cluster comprising a collection of foam blocks, comprising at least first, second, and third foam blocks, each said foam block having an elongate length, a width, and a thickness, each said foam block also having a top side, a bottom side, a left side, and a right side, each of said top side, said bottom side, said left side, and said right side extending along the entire length of the respective said foam block, each said foam block also having top, bottom, left, and right surfaces corresponding, respectively, to the top side, the bottom side, the left side, and the right side, a respective said foam block having a density of about 1 pound per cubic foot to about 8 pounds per cubic foot, said foam blocks in the given foam block cluster being arranged in sequential side by side relationship with each other such that next adjacent sides of respective ones of said foam blocks are facing each other, whereby said first and second foam blocks comprise a first pair of next adjacent foam blocks in side by side relationship with each other, said second and third foam blocks comprise a second pair of next adjacent foam blocks in side by side relationship with each other, and optional subsequent foam blocks comprise subsequent pairs of next adjacent foam blocks in side by side relationship with each other, starting at said third foam block on a said side of said third foam block opposite said second foam block, whereby surfaces of the respective sides of next adjacent ones of said foam blocks face each other, said foam blocks being so arranged, in side by side relationship to each other that each said foam block defines at least a portion of a top of the respective said foam block cluster and at least a portion of a bottom of the respective said foam block cluster, a resin flow medium being disposed between the outer, facing, surfaces of the respective sides of each pair of next adjacent ones of said foam blocks.

27. The fiber-reinforced polymeric structural building panel as in claim 26, said foam blocks being wrapped with fibrous wrapping layers, a resin flow medium (192) being disposed between the outer surfaces of ones of said wrapping layers at the respective sides of each pair of next adjacent ones of said foam blocks, said fibrous wrapping layer on next adjacent ones of said foam blocks being spaced from each other by said resin flow medium (192).

28. The fiber-reinforced polymeric structural building panel as in claim 26, each foam block being wrapped in a fibrous wrapping layer, wrapped about, and facing, both the left side and the right side of the respective foam block, such that each foam block is a wrapped foam block, wrapped in an individual wrapping layer, separate and distinct from any wrapping layer wrapping any other foam block.

29. The fiber-reinforced polymeric structural building panel as in claim 28 wherein a given said wrapping layer is adhered to the sides of the respective said foam block.

30. The fiber-reinforced polymeric structural building panel as in claim 26, a mechanical keeper securing said foam blocks, in said block cluster, to each other, by a said mechanical keeper extending through a plurality of foam blocks, or extending about a plurality of foam blocks.

31. The fiber-reinforced polymeric structural building panel as in claim 30, said mechanical keeper being selected from the group consisting of
    a thread extending, under substantial tension, in generally a straight line through each said foam block in said block cluster from said first block, through each sequential foam block, to an opposing end block on an opposing end of said block cluster,
    one or more securing layers extending over the top, about the sides, and across the bottom, of said block cluster, in surface to surface relationship with any wrapping layers, collectively defining an outer surface of said block cluster at the top, the bottom, and the opposing sides of said block cluster, and securing said foam blocks to each other in such side by side relationship, and
    one or more plastic or metal straps extending over the top, about the sides, and across the bottom, of said block cluster, in surface to surface relationship with any such wrapping layers, said one or more straps securing said foam blocks to each other in such side by side relationship.

32. The fiber-reinforced polymeric structural building panel as in 1, said building panel further comprising a plurality of foam block clusters disposed between said inner layer and said outer layer, at least one said foam block cluster reflecting having been fabricated separate from fabrication of said main body, each said foam block cluster comprising a plurality of foam blocks, each said foam block, in a given said foam block cluster, having a top, a bottom, a left side, and a right side, said building panel, when installed in an upright orientation, having a length and a height, and a thickness defined between said inner layer and said outer layer, a given said foam block, in a respective said foam block cluster, having a length extending along the height of said building panel, a width extending along the length of said building panel, and a thickness extending along the thickness of said building panel, a resin flow medium being disposed between respective opposing pairs of next adjacent ones of said foam blocks, forming intercostal precursors, at least one respective said resin flow medium and said facing next adjacent foam blocks in each said intercostal precursor reflecting having been wetted with resin before the respective foam blocks and the respective said resin flow medium are brought into engaging relationship with each other in the process of fabricating said block cluster, said block cluster being devoid of any mechanical keeper.

33. The fiber-reinforced polymeric structural building panel as in claim 32, a respective said resin flow medium (192) being spaced from the respective said opposing pairs of foam blocks.

34. The fiber-reinforced polymeric structural building panel as in claim 1, said building panel further comprising a plurality of foam block clusters disposed between said inner layer and said outer layer, at least one said foam block cluster reflecting having been fabricated separate from fabrication of said main body, each said foam block cluster comprising a plurality of foam blocks, each said foam block, in a given said foam block cluster, having a top, a bottom, a left side, and a right side, said building panel, when installed in an upright orientation, having a length and a height, and a thickness defined between said inner layer and said outer layer, a given said foam block, in a respective said foam block cluster, having a length extending along the height of said building panel, a width extending along the length of said building panel, and a thickness extending along the thickness of said building panel, wherein each foam block is wrapped with a fibrous wrapping layer, and at least one portion of said fibrous wrapping layer, proximate the surface of said foam block which will face a next adjacent foam block in fabrication of said block cluster, reflecting having been wetted with resin prior to assembly of said foam block cluster, said foam block cluster being devoid of any mechanical keeper and devoid of any resin flow medium.

35. The fiber-reinforced polymeric structural building panel as in claim 1 wherein a cross-section of a given said stud comprises a closed profile such as a polygon.

36. A fiber-reinforced polymeric structural building panel having a length, a top and a bottom, and comprising:
  (a) as a first component of said building panel, a main body, fabricated in a first fabrication process and comprising
    (i) an outer fiber-reinforced polymeric layer, said outer fiber-reinforced polymeric layer comprising a first set of fibers in a first reaction-cured resin composition, said outer fiber-reinforced polymeric layer defining a first outermost surface of said main body;
    (ii) an inner fiber-reinforced polymeric layer, said inner fiber-reinforced polymeric layer comprising a second set of fibers in a second reaction-cured resin composition, said inner fiber-reinforced polymeric layer defining a second outermost surface of said main body, opposite the outermost surface; and
  (b) as a second component of said building panel, a plurality of load-bearing studs, spaced along the length of said main body and extending, from said inner fiber-reinforced polymeric layer, away from the second outermost surface, including away from said main body, said studs extending along the height of said building panel between the top and the bottom of said building panel, at least one of said studs being mounted to the second outermost surface of said main body, a given said stud comprising first and second end walls (126), and first and second legs (128), said end walls and said legs collectively defining a stud cross-section having a plurality of corners (88), wherein thickness of at least one said end wall or leg is relatively thicker adjacent a said corner (88), and relatively thinner at a mid-portion (45) of the respective end wall or leg between respective said stud corners.

37. The fiber-reinforced polymeric structural building panel as in claim 36, wherein said first end wall of a respective said stud is disposed toward said inner fiber-reinforced polymeric layer of said main body, and wherein first and second mechanical fasteners extend through said first end wall into said main body, and axial extensions of said first and second mechanical fasteners extend through opposing ends of the respective said stud.

38. The fiber-reinforced polymeric structural building panel as in claim 37, said second end wall being disposed opposite said first end wall, further comprising an access port in said second end wall, spaced from opposing ends of said stud, a third mechanical fastener being disposed inwardly of said access port, toward said first end wall, with a shank of said third mechanical fastener extending through said first end wall and into said main body, and a head of said third mechanical fastener being between said access port and said first end wall.

39. The fiber-reinforced polymeric building panel as in claim 37, a respective said stud being mounted to the inner surface of said main body, axial extensions of said first and second mechanical fasteners extending through opposing open ends of the respective said stud.

40. The fiber-reinforced polymeric building panel as in claim 36, a respective said stud being mounted to the inner surface of said main body by at least first and second mechanical fasteners proximate opposing ends of the respective said stud.

41. The fiber-reinforced polymeric structural building panel as in claim 36 wherein a cross-section of a given said stud comprises a closed profile such as a polygon.

\* \* \* \* \*